(12) United States Patent
Tani et al.

(10) Patent No.: US 6,649,304 B2
(45) Date of Patent: Nov. 18, 2003

(54) NICKEL-SERIES RECHARGEABLE BATTERY AND PROCESS FOR THE PRODUCTION THEREOF

(75) Inventors: Atsushi Tani, Nara (JP); Soichiro Kawakami, Nara (JP)

(73) Assignee: Canon Kabushiki Kaisha, Tokyo (JP)

( * ) Notice: Subject to any disclaimer, the term of this patent is extended or adjusted under 35 U.S.C. 154(b) by 275 days.

(21) Appl. No.: 09/880,767

(22) Filed: Jun. 15, 2001

(65) Prior Publication Data

US 2002/0037455 A1 Mar. 28, 2002

(30) Foreign Application Priority Data

Jun. 16, 2000 (JP) .......................... 2000-181389

(51) Int. Cl.[7] .......................... H01M 4/32; H01M 4/52; H01M 4/58
(52) U.S. Cl. ..................................... 429/223
(58) Field of Search ........................ 429/223

(56) References Cited

U.S. PATENT DOCUMENTS

| | | | |
|---|---|---|---|
| 5,919,589 A | | 7/1999 | Kawakami et al. ...... 429/231.8 |
| 6,010,801 A | * | 1/2000 | Nakamaru et al. .......... 429/161 |
| 6,013,389 A | * | 1/2000 | Nakamaru et al. .......... 429/161 |
| 6,013,390 A | * | 1/2000 | Kimiya et al. ............... 429/206 |
| 6,074,785 A | | 6/2000 | Dansui et al. ............... 429/223 |
| 6,153,334 A | * | 11/2000 | Sakamoto et al. .......... 429/223 |
| 6,165,642 A | | 12/2000 | Kawakami et al. ....... 429/218.1 |
| 6,249,940 B1 | * | 6/2001 | Asano et al. ..................... 29/2 |

FOREIGN PATENT DOCUMENTS

| | | |
|---|---|---|
| EP | 0 848 438 | 6/1998 |
| JP | 10-50307 | 2/1998 |
| JP | 10-172561 | 6/1998 |
| JP | 10-172563 | 6/1998 |
| JP | 10-289714 | 10/1998 |

* cited by examiner

Primary Examiner—Randy Gulakowski
(74) Attorney, Agent, or Firm—Fitzpatrick, Cella, Harper & Scinto

(57) ABSTRACT

A nickel-series rechargeable battery whose cathode active material comprising a material containing an amorphous phase-bearing nickel hydroxide particulate which in X-ray diffraction using K$\alpha$-rays of Cu as a radiation source, has a diffraction peak of a (001) face appeared near a diffraction angle $2\theta=19°$ having a half-value width of more than $1.2°$ and has a diffraction peak of a (101) face appeared near a diffraction angle $2\theta=38°$ having a half-value width of more than $1.5°$. A process for the production of said rechargeable battery.

67 Claims, 10 Drawing Sheets

ENLARGED VIEW OF ESSENTIAL PART
(CROSS-SECTIONAL IMAGE VIEW)

F I G. 2
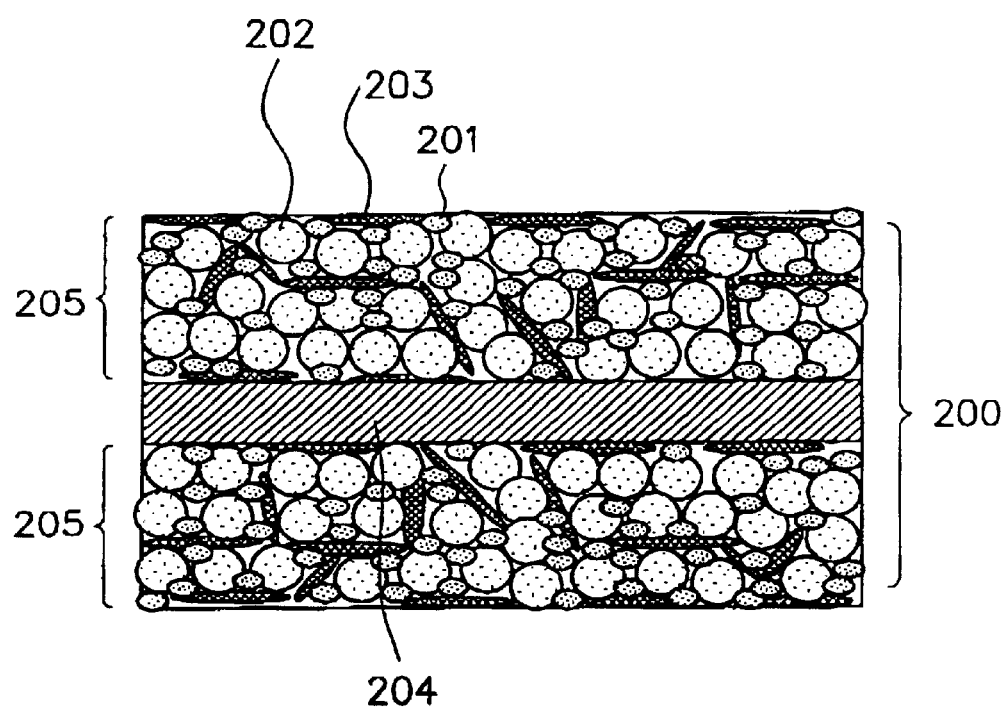

F I G. 4
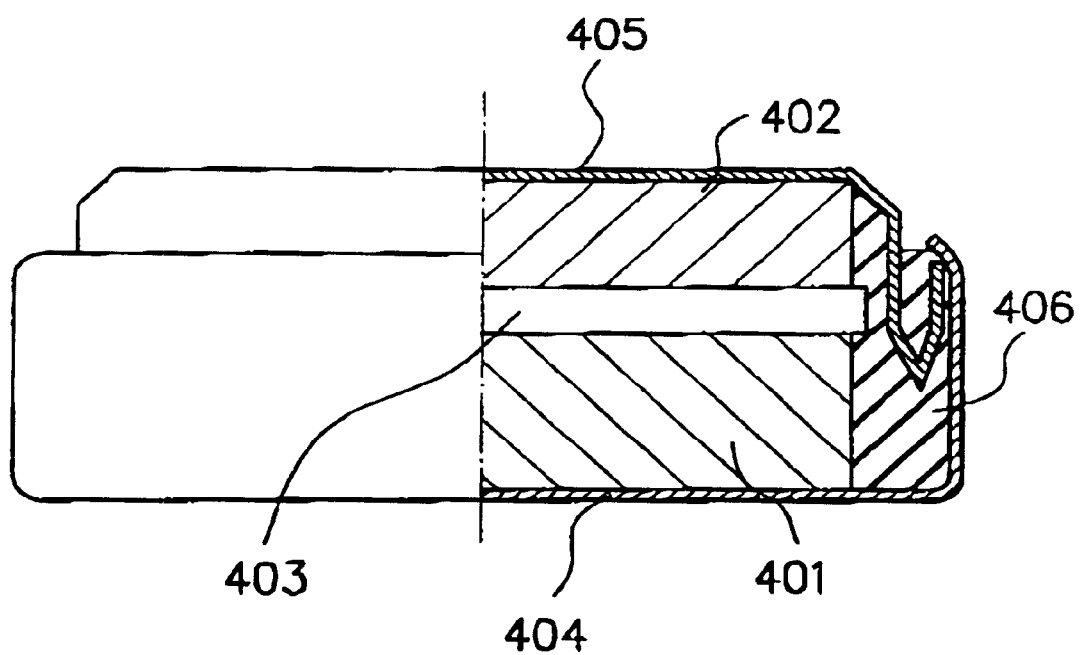

F I G. 6
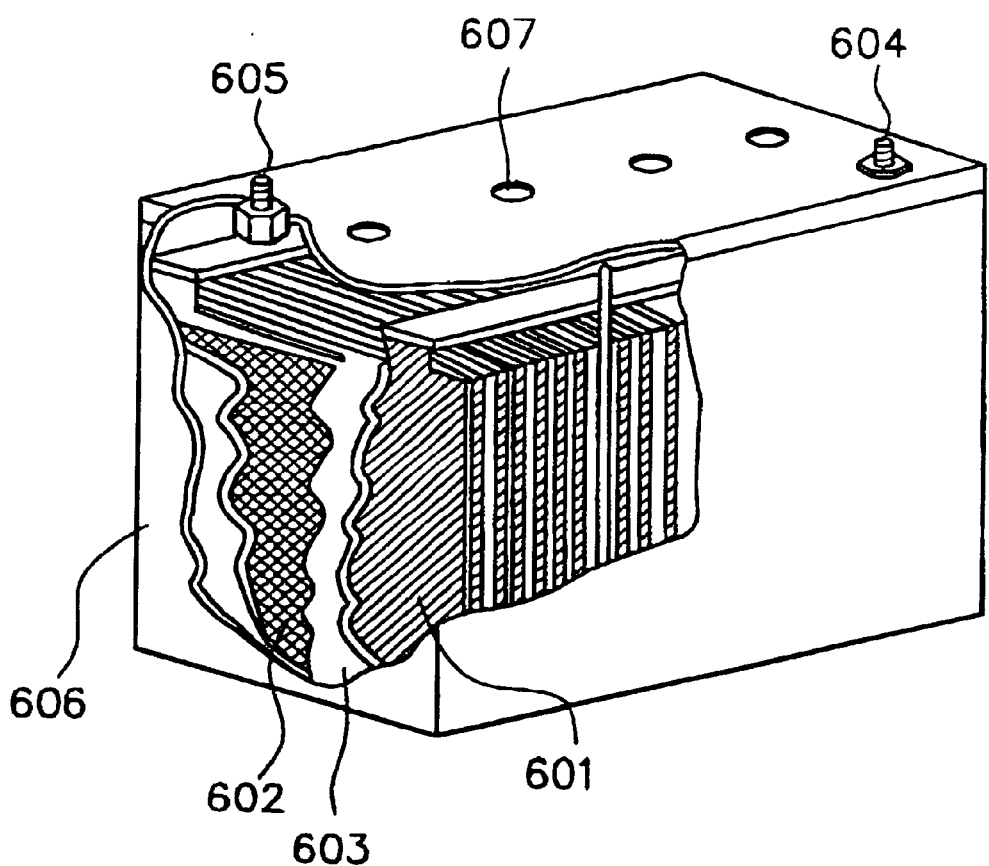

F I G. 10
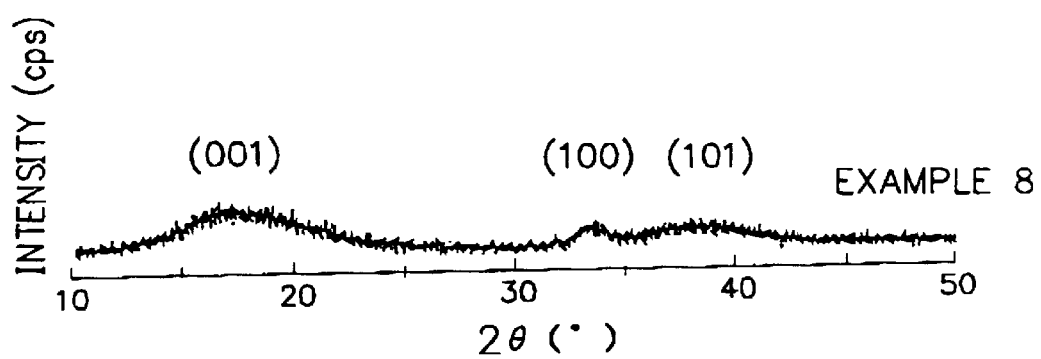

NICKEL-SERIES RECHARGEABLE BATTERY AND PROCESS FOR THE PRODUCTION THEREOF

BACKGROUND OF THE INVENTION

1. Field of the Invention

The present invention relates to a rechargeable battery whose cathode principally comprising a nickel hydroxide (this rechargeable battery will be hereinafter referred to as a nickel series rechargeable battery) and a process for producing said nickel series rechargeable battery. More particularly, the present invention relates to a nickel series rechargeable battery having a high energy density, excelling in resistance to overcharge, and having a prolonged cycle life, wherein the cathode comprises an active material principally comprising a specific amorphous phase-bearing nickel hydroxide particulate having a prolonged lifetime and which has a high utilization efficiency of the active material (the "utilization efficiency of the active material" will be hereinafter referred to as "active-material utilization efficiency"). The present invention includes a process for the production of said nickel series rechargeable battery.

2. Related Background Art

In recent years, the global warming of the earth because of the so-called greenhouse effect due to an increase in the content of $CO_2$ gas in the air has been predicted. For instance, in thermal electric power plants, thermal energy obtained by burning a fossil fuel is being converted into electric energy, and along with burning of such fossil fuel, a large amount of $CO_2$ gas is being exhausted in the air. Accordingly, in order to suppress this situation, there is a tendency of prohibiting to newly establish a thermal electric power plant. Under these circumstances, so-called load leveling practice has been proposed in order to effectively utilize electric powers generated by power generators in thermal electric power plants or the like, wherein a surplus power unused in the night is stored in rechargeable batteries installed at general houses and the power thus stored is used in the daytime when the demand for power is increased, whereby the power consumption is leveled.

Now, for electric vehicles which do not exhaust any air polluting substances such as $CO_2$, $NO_x$, hydrocarbons and the like, there is an increased demand for developing a high performance rechargeable battery with a high energy density which can be effectively used therein. Besides, there is also an increased demand for developing a miniature, lightweight, high performance rechargeable battery usable as a power source for portable instruments such as small personal computers, word processors, video cameras, and cellular phones.

In order to comply with these demands, research and development have been vigorously conducting on nickel-series rechargeable batteries in which a nickel hydroxide is used as a cathode active material, specifically nickel-metal hydride rechargeable batteries in which an anode comprising a hydrogen absorption alloy as an anode active material and a cathode a comprising a nickel hydroxide as a cathode active material are arranged through a separator having an alkaline electrolyte solution retained therein nickel-zinc rechargeable batteries in which an anode comprising a zinc material as an anode active material and a cathode comprising a nickel hydroxide as a cathode active material are arranged through a separator having an alkaline electrolyte solution retained therein. And some of these nickel series rechargeable batteries have been putted to practical use.

Incidentally, as the cathode of such nickel series rechargeable battery, a sintered type electrode has been often used. Besides, in order to more increase the battery capacity, there has proposed use of a paste-type electrode comprising a porous metallic body having a high porosity which is filled with a powdery active material of nickel hydroxide kneaded with a solution containing a binder dispersed therein as the cathode of the rechargeable battery. Now, nickel hydroxide as the cathode active material is low in terms of the conductivity and therefore, in the case where the electrode is filled substantially with nickel hydroxide only as above described, it is difficult to attain a sufficient active-material utilization efficiency. In this respect, in order for the cathode to have a sufficient active-material utilization efficiency, there has proposed a method of adding a cobalt metallic powder or a powder of a cobalt compound such as cobalt monoxide to the powdery nickel hydroxide active material upon the formation of the cathode. Here, for the case where cobalt compound is used together with nickel hydroxide in the cathode, there is generally considered such that after the cobalt compound is once dissolved in the alkaline electrolyte solution, it is oxidized upon initially subjecting the rechargeable battery to charging, followed by depositing as a highly conductive cobalt oxyhydroxide on the surface of the nickel hydroxide to form a conductive network over the surface of the nickel hydroxide. However, in the case where the cobalt metallic powder or the cobalt compound powder is added as above described, it is difficult for such cobalt metallic powder or such cobalt compound powder to be uniformly dispersed in the paste, and because of this, it is not ensured that an uniform conductive network is always formed over the surface of the nickel hydroxide.

In this respect, in order to make it possible to form an uniform conductive network over the surface of the to nickel hydroxide, there has proposed a method in which the surface of a nickel hydroxide particulate is covered by a cobalt hydroxide in advance. However, this method is not always effective for the reason that the solubility of the cobalt hydroxide in the alkaline electrolyte solution is inferior and therefore, the cobalt hydroxide is not sufficiently converted into the cobalt oxyhydroxide, where the active-material utilization efficiency is not always sufficient. In addition, the nickel hydroxide is small in terms of the oxygen overvoltage and because of this, especially when charging operation of the nickel-series rechargeable battery is performed under high temperature condition, side reaction of generating oxygen gas is liable to occur, where the charging efficiency is decreased.

In order to eliminate these problems, there have proposed a method in which a cobalt solid solution is incorporated in a nickel hydroxide crystal as the active material of the cathode and a method in which a material capable of increasing oxygen generation potential such as calcium hydroxide or yttrium oxide is added upon the formation of the cathode comprising a nickel hydroxide. However, any of these two methods is not adequate. That is, although the former method has an advantage in that the oxidation potential of the nickel hydroxide is decrease to improve the charging efficiency of the battery, it has a disadvantage in that the discharging voltage of the battery is decreased. For the latter method, it has an advantage in that the charging efficiency of the battery under high temperature condition is improved, but it has a disadvantage in that because not only the calcium hydroxide but also the yttrium hydroxide are inferior in terms of the conductivity, the active-material utilization efficiency of the cathode even under room temperature condition tends to decrease.

Separately, for a nickel series rechargeable battery whose cathode comprises an active material (that is, an active material layer) comprising a nickel hydroxide, there are disadvantages such that the active material layer of the cathode is liable to suffer from a great change in the volume (specifically, the active material layer is liable to repeatedly greatly expand and shrink) upon repeating the charging-and-discharging cycle where when the volume of the active material layer of the cathode is changed, the alkaline electrolyte solution retained in the separator situated between the anode and the cathode is likely to be absorbed by the active material layer of the cathode, resulting in shortening the lifetime of the rechargeable battery. The reason for this is considered as will be described in the following. That is, a nickel hydroxide is a crystalline material having a layer structure with a hexagonal system. As the nickel hydroxide used as the cathode active material of the nickel series rechargeable battery, there is usually used a β-type nickel hydroxide. In this case, the inter-layer distance of the β-type nickel hydroxide as the cathode active material is about 0.46 nm. And, the inter-layer distance of a β-type nickel oxyhydroxide as a product provided when the β-type nickel hydroxide as the cathode active material is subjected to charging is about 0.48 nm. However, upon subjecting the β-type nickel hydroxide as the cathode active material to charging, a γ-type nickel oxyhydroxide having a structure in which alkali metal ion or water molecule originated from the alkaline electrolyte solution is entrapped is additionally produced as a by-product, where the inter-layer distance of the γ-type nickel oxyhydroxide is about 0.69 nm. Incidentally, it is known that the γ-type nickel oxyhydroxide as the by-product is more liable to generate when the rechargeable battery is over-charged. Now, under such condition where the T-type nickel oxyhydroxide as the by-product is generated, upon the repetition of the charging-and-discharging cycle, because the volume of the active material layer of the cathode is greatly changed (expanded and shrunk), there is a tendency in that the number of micropores present in the particulate of the nickel hydroxide is gradually increased as the charging-and-discharging cycle is progressed and as a result, the particulate of the nickel hydroxide is collapsed. In order to prevent this problem from being occurred, there is known a method in which cadmium or zinc in a solid solution state is incorporated in the crystalline structure of the nickel hydroxide (the β-type nickel hydroxide).

Now, a nickel hydroxide (a β-type nickel hydroxide) can be prepared by a reactive crystallization method wherein an aqueous solution of an alkali such as sodium hydroxide is dropwise added to an aqueous solution containing a nickel salt dissolved therein while stirring the nickel salt aqueous solution to precipitate a nickel hydroxide (a β-type nickel hydroxide). In this case, by introducing a prescribed amount of a prescribed cadmium salt or a prescribed zinc salt, it is possible to obtain a nickel hydroxide particulate incorporated with cadmium or zinc. When this nickel hydroxide particulate is used as the active material of the foregoing cathode, it will be possible to restrain the generation of a γ-type nickel oxyhydroxide in ordinary charging or discharging region. However, it is difficult to ensure that the generation of the γ-type nickel oxyhydroxide in over-charging region is sufficiently restrained. Separately, in order to improve the effect of restraining the generation of the γ-type nickel oxyhydroxide, when a nickel hydroxide particulate obtained by increasing the amount of the cadmium salt or the zinc salt introduced in the above method is used as the active material of the cathode, a problem entails such that the relative amount of the nickel hydroxide (the β-type nickel hydroxide) in the active material of the cathode is decreased, where it is difficult to make the cathode have a high capacity.

In this respect, as other method of restraining the generation of the γ-type nickel oxyhydroxide, there is known a method in that the crystallinity of the nickel hydroxide is decreased. For instance, Japanese Unexamined Patent Publication No. 172563/1998 discloses a method in which in the course of preparing a nickel hydroxide by such reactive crystallization method as above described, by properly controlling the pH value, temperature, agitation speed, and the like of the reaction solution, the crystallinity of a nickel hydroxide particulate obtained is decreased. Besides, Japanese Unexamined Patent Publication No. 50307/1998 discloses a method in which by adding a mechanical energy comprising a compression force and a frictional force to the surface of a nickel hydroxide particulate, the crystallinity of the nickel hydroxide particulate is decreased. Here, the nickel hydroxide particulate obtained by the former method has a half-value width of a diffraction peak of a (101) crystal face in X-ray diffraction using Kα-rays of Cu as a radiation source which is about 0.9°, and similarly, the nickel hydroxide particulate obtained by the latter method has a half-value width, which is about 1.0°. Thus, even by these methods, it is difficult to decrease the crystallinity of the nickel hydroxide particulate to a level capable of sufficiently restrain the generation of the γ-type nickel oxyhydroxide. Thus, it is understood that these methods are difficult to afford an effect apparently superior to that by the method by way of introducing cadmium or zinc in a solid solution state.

Incidentally, there has been attempted to improve the capacity of the cathode active material itself by positively utilizing the γ-type nickel oxyhydroxide.

Here, the nickel valence number of the foregoing β-type nickel hydroxide is 2.1, and that of the foregoing β-type nickel oxyhydroxide is 3.1. And the charge-and-discharge reaction between the foregoing β-type nickel hydroxide and the β-type nickel oxyhydroxide becomes to be a 1.0 electron reaction which is subtracting said 2.1 from said 3.1. On the other hand, the nickel valence number of the γ-type nickel oxyhydroxide is approximately 3.5.

In the light of this situation, when the charge-and-discharge reaction between the β-type nickel hydroxide and the γ-type nickel oxyhydroxide is considered, the charge-and-discharge reaction becomes to be a 1.4 electron reaction which is subtracting said 2.1 from said 3.5.

From this, it is thought that if the γ-type nickel oxyhydroxide can be efficiently produced, it will be possible to improve the active-material utilization efficiency until 140%.

Now, there are proposals to use a γ-type nickel oxyhydroxide in a nickel series rechargeable battery. For instance, Japanese Unexamined Patent Publication No. 172561/1998 discloses a rechargeable battery whose cathode has an active material layer composed of an β-type nickel hydroxide which is approximate a γ-type nickel oxyhydroxide in terms of the inter-layer distance. However, this rechargeable battery has a drawback in that the α-type nickel hydroxide as the cathode active material is readily oxidized into a γ-type nickel oxyhydroxide when the rechargeable battery is subjected charging, where the capacity of the cathode active material layer is increased but the density of the cathode active material itself is low, and therefore, the cathode active material layer is insufficient in terms of the density. Besides, Japanese Unexamined Patent Publication No. 289714/1998 discloses a rechargeable battery whose cathode has an active material layer composed of a nickel hydroxide particulate obtained by admixing manganese (Mn), aluminum (Al) or chromium (Cr) in a solid solution state in a nickel hydroxide crystalline. Although this rechargeable battery has an advantage in that an improvement in the active-material utilization efficiency of the cathode is attained at an initial stage of the charging-and-discharging cycle, it has disadvantages in that the volume change (the expansion and shrinkage) of the active material layer of the cathode is difficult to be essentially improved, and because of this, it is difficult to sufficiently prolong the charging-and-discharging cycle life.

SUMMARY OF THE INVENTION

The present invention has been accomplished in view of the foregoing situation in the prior art for the nickel series rechargeable batteries whose cathode comprising nickel hydroxide.

An object of the present invention is to provide a nickel series rechargeable battery whose cathode having an active material layer formed of a specific nickel hydroxide particulate and which has an improved active-material utilization efficiency and a high energy density, excels in resistance to overcharge (hereinafter ref erred to as overcharge resistance), and has a prolonged charging-and-discharging cycle life.

Another object of the present invention is to provide a process for producing said rechargeable battery.

The rechargeable battery provided according to the present invention includes the following three embodiments.

A first embodiment of the rechargeable battery according to the present invention is a rechargeable battery comprising at least a cathode, an anode, a separator, and an electrolyte comprising an alkali electrolyte solution, said cathode comprising an active material layer which participates in battery reaction and a collector, characterized in that said active material layer of said cathode comprises a material containing an amorphous phase-bearing nickel hydroxide particulate which in X-ray diffraction using Kα-rays of Cu as a radiation source, has a diffraction peak of a (001) face appeared near a diffraction angle 2θ=19° having a half-value width of more than 1.2 and has a diffraction peak of a (101) face appeared near a diffraction angle 2θ=38° having a half-value width of more than 1.5°. The amorphous phase-bearing nickel hydroxide particulate is also featured that a crystallite size in a direction perpendicular to the (001) face and a crystallite size in a direction perpendicular to the (101) face which are calculated from the result of the X-ray diffraction are respectively less than 8 nm. The amorphous phase-bearing nickel hydroxide particulate is further featured that it comprises particles in an undefined form having an average particle size in a range of 0.2 to 2 μm. The amorphous phase-bearing nickel hydroxide particulate may contain Zn or/and Cd respectively as a minor component. The amount of Zn or/and Cd to be contained is 0.2 wt. % or less on the basis of the amount of the hydroxide.

A second embodiment of the rechargeable battery according to the present invention is that the active material layer of the cathode comprises the above-described amorphous phase-bearing nickel hydroxide particulate, an electrically conductive material comprising a metallic cobalt or/and a cobalt compound, and an additive comprising at least one kind of a metal compound selected from the group consisting of alkaline earth metal compounds, rare earth metal compounds, transition metal compounds of transition metal elements belonging to groups 4B, 5B, 6B, and 7B of the periodic table, and metal compounds of metal elements belonging to group 3A of the periodic table. In this case, it is possible for the electrically conductive material or/and the additive to be contained such that they cover part of or the entirety of the surface of the amorphous phase-bearing nickel hydroxide or they are combined with the amorphous phase-bearing nickel hydroxide.

The addition amount of the electrically conductive material is preferred to be in a range of 5 to 20 wt. % versus the total amount of the constituents of the active material layer. The cobalt compound as the electrically conductive material can include cobalt monoxide, cobalt hydroxide, and cobalt oxides having an alkali metal contained therein. The alkali metal can include K, Na, and Li. The addition amount of the additive is preferred to be in a range of 1 to 5 wt. % versus the total amount of the constituents of the active material layer. The alkaline earth metal compound as the additive can include oxides and hydroxides of calcium (Ca), oxides and hydroxides of magnesium (Mg), oxides and hydroxides of strontium (Sr), and oxides and hydroxides of barium (Ba). The rare earth metal compound as the additive can include oxides and hydroxides of yttrium (Y), oxides and hydroxides of holmium (Ho), oxides and hydroxides of erbium (Er), oxides and hydroxides of thulium (Tm), oxides and hydroxides of ytterbium (Yb), and oxides and hydroxides of lutetium (Lu). The transition metal compound as the additive can include oxides and hydroxides of titanium (Ti), oxides and hydroxides of vanadium (V), oxides and hydroxides of chromium (Cr), and oxides and hydroxides of manganese (Mg). The group 3A compound as the additive can include oxides and hydroxides of aluminum (Al), oxides and hydroxides of gallium (Ga), and oxides and hydroxides of indium (In). Of these metal compounds as the additive, oxides and hydroxides of yttrium (Y), oxides and hydroxides of ytterbium (Yb), oxides and hydroxides of calcium (Ca), and oxides and hydroxides of aluminum (Al) are particularly preferable.

A third embodiment of the rechargeable battery according to the present invention is that the active material layer of the cathode principally comprises the foregoing amorphous phase-bearing nickel hydroxide particulate described in the first embodiment and a crystalline nickel hydroxide particulate which in X-ray diffraction using Kα-rays of Cu as a radiation source, has a diffraction peak of a (001) face appeared near a diffraction angle 2θ=19° having a half-value width of less than 0.8° and has a diffraction peak of a (101) face appeared near a diffraction angle 2θ=38° having a half-value width of less than 1.1°.

The crystalline nickel hydroxide particulate is preferred to comprises particles in a substantially spherical form having an average particle size in a range of 5 to 30 μm. The average particle size of the crystalline nickel hydroxide particulate is preferred to be 5 times or more that of the amorphous phase-bearing nickel hydroxide particulate.

The crystalline nickel hydroxide particulate is preferred to contain at least one kind of an element selected from the group consisting of Zn, Mg and Ba in a solid solution state.

As above described, the present invention provides a process for producing a nickel series rechargeable battery whose cathode having an active material layer formed of a specific nickel hydroxide particulate and which has an improved active-material utilization efficiency and a high energy density, excels in overcharge resistance, and has a prolonged charging-and-discharging cycle life.

The rechargeable battery-producing process includes the following three embodiments.

A first embodiment is a process for producing a rechargeable battery comprising at least a cathode, an anode, a separator, and an electrolyte comprising an alkali electrolyte solution, said cathode comprising an active material layer which participates in battery reaction and a collector, characterized in that said active material layer of said cathode is formed by using (a) an amorphous phase-bearing nickel hydroxide particulate which in X-ray diffraction using K$\alpha$-rays of Cu as a radiation source, has a diffraction peak of a (001) face appeared near a diffraction angle $2\theta=19°$ having a half-value width of more than 1.2° and has a diffraction peak of a (101) face appeared near a diffraction angle $2\theta=38°$ having a half-value width of more than 1.5°, (b) an electrically conductive material comprising a metallic cobalt or/and a cobalt compound, and (c) an additive comprising at least one kind of a metal compound selected from the group consisting of alkaline earth metal compounds, rare earth metal compounds, transition metal compounds of transition metal elements belonging to groups 4B, 5B, 6B, and 7B of the periodic table, and metal compounds of metal elements belonging to group 3A of the periodic table. The amorphous phase-bearing nickel hydroxide particulate (a) can be prepared by subjecting a prescribed nickel hydroxide powder to a mechanical grinding treatment. The mechanical grinding treatment is preferred to be conducted by using a grinding apparatus such as planetary ball mill, tumbling ball mill, or vibration ball mill. Besides, the amorphous phase-bearing nickel hydroxide particulate (a) can be prepared by a method wherein a solution containing a prescribed nickel compound dissolved therein is mixed with a chelating agent or a surface-active agent with a concentration which is greater than a critical micelle concentration and the mixture is reacted with an alkali. As the nickel compound, nickel nitrate, nickel chloride, nickel carboxylate, and nickel alkoxide can be selectively used. As the chelating agent, citric acid, tartaric acid, maleic acid, or acetylacetone can be used.

A second embodiment of the rechargeable battery-producing process is characterized in that in the first embodiment, the amorphous phase-bearing nickel hydroxide particulate (a) comprises particles having a surface which is partially or entirely covered by the above-described electrically conductive material (b) or/and the above-described additive (c) or the amorphous phase-bearing nickel hydroxide particulate (a) is combined with the electrically conductive material (b) or/and the additive (c) into a composite. The amorphous phase-bearing nickel hydroxide particulate (a) partially or entirely covered by the electrically conductive material (b) or/and the additive (c) or the composite comprising the amorphous phase-bearing nickel hydroxide particulate (a) and the electrically conductive material (b) or/and the additive (c) may be prepared by mechanically mixing (a) a prescribed nickel hydroxide particulate prior to amorphization, (b) a prescribed electrically conductive material or/and (c) a prescribed additive using a grinding apparatus such as planetary ball mill, tumbling ball mill, or vibration ball mill.

Besides, a material comprising the amorphous-phase bearing nickel hydroxide particulate (a) covered by the electrically conductive material (b) may be prepared by a manner in that a prescribed amorphous phase-bearing nickel hydroxide particulate (powder) is dispersed in a treating solution containing at least a prescribed cobalt salt dissolved therein, followed by being reacted with at least one kind of a compound selected from the group consisting of potassium hydroxide, sodium hydroxide, and lithium hydroxide. When the resultant obtained here is immersed in a solution containing at least one kind of a compound selected from the group consisting of potassium hydroxide, sodium hydroxide, and lithium hydroxide dissolved therein, followed by subjecting to a heat treatment in the presence of oxygen, there can be formed an amorphous phase-bearing nickel hydroxide particulate (a) covered by a highly electrically conductive coat layer. The cobalt salt contained in the above treating solution can include cobalt sulfate, cobalt nitrate, and cobalt chloride. It is possible for the treating solution to additionally contain at least one kind of a metal compound selected from the group consisting of alkaline earth metal compounds, rare earth metal compounds, transition metal compounds of transition metal elements belonging to groups 4B, 5B, 6B, and 7B of the periodic table, and metal compounds of metal elements belonging to group 3A of the periodic table.

Separately, when a prescribed amorphous phase-bearing nickel hydroxide particulate (a) is mixed with a cobalt salt capable of being decomposed at a temperature which is lower than the decomposition temperature of the nickel hydroxide and the mixture is heated until a temperature where the cobalt salt is decomposed, there can be formed an amorphous phase-bearing nickel hydroxide particulate covered by an electrically conductive material. As the cobalt salt, cobalt nitrate is preferable. When the resultant obtained in this case is immersed in a solution containing at least one kind of a compound selected from the group consisting of potassium hydroxide, sodium hydroxide, and lithium hydroxide dissolved therein, followed by subjecting to a heat treatment in the presence of oxygen, there can be formed an amorphous phase-bearing nickel hydroxide particulate (a) covered by a highly electrically conductive coat layer.

A third embodiment of the rechargeable battery-producing process is characterized in that in the first embodiment, in addition to the amorphous phase-bearing nickel hydroxide particulate (a), the electrically conductive material (b) or/and the additive (c), there is used a crystalline nickel hydroxide particulate (d) which in X-ray diffraction using K$\alpha$-rays of Cu as a radiation source, has a diffraction peak of a (001) face appeared near a diffraction angle $2\theta=19°$ having a half-value width of less than 0.8° and has a diffraction peak of a (101) face appeared near a diffraction angle $2\theta=38°$ having a half-value width of less than 1.1°. The crystalline nickel hydroxide particulate (d) is preferred to comprises particles in a substantially spherical form and have an average particle size which is 5 times or more that of the amorphous phase-bearing nickel hydroxide particulate (a).

The crystalline nickel hydroxide particulate (d) is preferred to comprises particles in a substantially spherical form having a surface which is partially or entirely covered by the electrically conductive material (b) or/and the additive. It is preferred that the amount of the crystalline nickel hydroxide particulate (d) to be added is controlled to fall in a range of from 10 to 70 wt. % versus the total amount of the constituents of the active material layer of the cathode.

The crystalline nickel hydroxide particulate (d) is preferred to contain at least one kind of an element selected from the group consisting of Zn, Mg and Ba in a solid solution state.

The cathode in the present invention may be formed, for instance, in the following manner. A prescribed amorphous phase-bearing nickel hydroxide particulate (a), or said amorphous phase-bearing nickel hydroxide particulate (a) and a prescribed crystalline nickel hydroxide particulate (d), a prescribed electrically conductive material (b), and a prescribed additive (c) are mixed to obtain a mixture, the mixture is mixed with a solution containing a binder dissolved therein to obtain a paste, and the paste is applied to a porous metal body formed of a nickel material or a nickel-plated metallic material or a nonwoven member formed of a metallic fiber as a collector such that the porous metal body or the nonwoven member as the collector is impregnated with the paste. Alternatively, the cathode may be formed by arranging the paste on the surface of a punching metal member, an expanded metal member or a metal foil respectively comprising a nickel material or a nickel-plated metallic material as a collector to form a layer as the active layer of the cathode. In the latter case, if necessary, the paste may be added with an electrically conductive auxiliary in a flake form, a spherical form, a filament form, a needle form, or a spike form, comprising at least one kind of a powdery material selected from the group consisting of a nickel powder, a copper powder, and a carbon powder. The binder of the paste can include methyl cellulose, carboxymethylcellulose, and polyvinyl alcohol.

As the alkali electrolyte solution used in the rechargeable battery of the present invention, it is preferred to use an aqueous solution containing potassium hydroxide dissolved therein at a concentration in a range of from 8 to 12 mol/l. The potassium hydroxide aqueous solution as the alkali electrolyte solution may contain lithium hydroxide or/and sodium hydroxide.

In the rechargeable battery-producing process of the present invention, after a rechargeable battery is produced using the foregoing cathode, an anode, a separator, and aforesaid alkali electrolyte solution, the rechargeable battery is over-charged so that the rechargeable battery is charged with an electricity quantity corresponding to 200% or more of the capacity of the cathode, and thereafter, for the rechargeable battery thus over-charged, discharging is preformed until the voltage of the rechargeable battery reaches a prescribed battery voltage. The operation is conducted at least one or more times. By performing this operation, the rechargeable battery is deeply charged and discharged while preventing occurrence of γ-type nickel oxyhydroxide, where the nickel hydroxide as the active material of the cathode is effectively activated to exhibit an improved active-material utilization efficiency in the charging-and-discharging cycle thereafter.

According to the present invention, by using a cathode formed using a specific amorphous phase-bearing nickel hydroxide particulate (or a specific amorphous nickel hydroxide particulate), there can be attained a rechargeable battery (specifically, a nickel-metal hydride rechargeable battery) which is provided with an improved cathode which is high in terms of the packing density of the active material and has a high active-material utilization efficiency, and which excels in overcharge resistance and a prolonged charging-and-discharging cycle life. The present invention is applicable also in other nickel series rechargeable batteries such as a nickel-zinc rechargeable battery, a nickel-cadmium rechargeable battery, and the like.

BRIEF DESCRIPTION OF THE DRAWINGS

FIG. 2 is a schematic cross-sectional view illustrating the structure of another example of a cathode used in a rechargeable battery of the present invention.

FIG. 4 is a schematic cross-sectional view illustrating an example of a single-layer structure type flat rechargeable battery according to the present invention.

FIG. 6 is a schematic perspective view illustrating an example of a prismatic rechargeable battery according to the present invention.

FIG. 10 shows an X-ray diffraction chart of an amorphous phase-bearing nickel hydroxide particulate (powder) used in a rechargeable battery of Example 8 which will be described layer.

DESCRIPTION OF THE INVENTION AND PREFERRED EMBODIMENTS

In the following, preferred embodiments of the present invention will be described with reference to the drawings.

Figure 1:
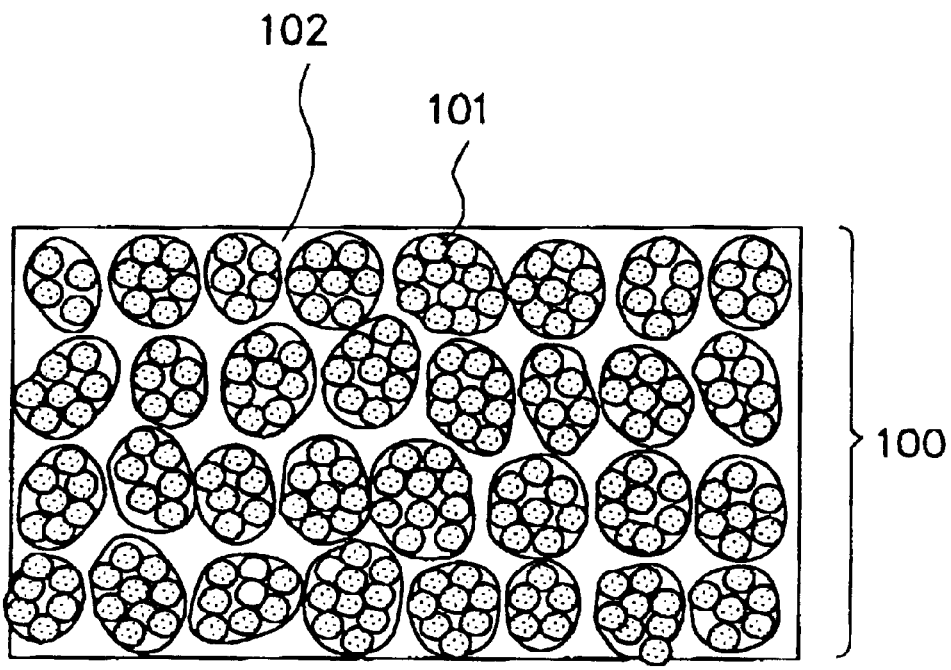
FIG. 1 is a schematic cross-sectional view illustrating the structure of an example of a cathode used in a rechargeable battery of the present invention.
Figure 1:
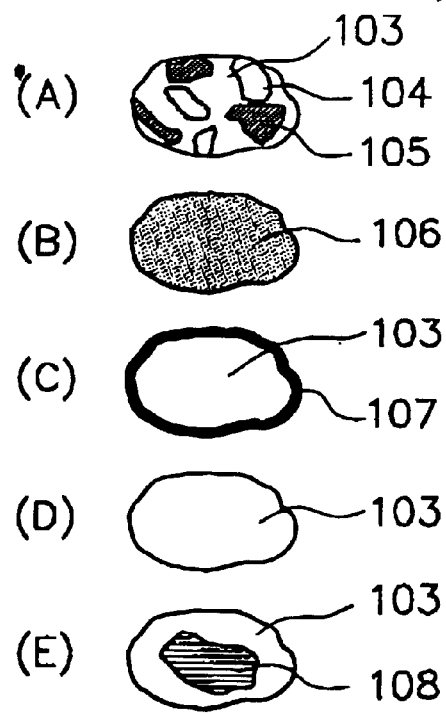

FIG. 1 is a schematic cross-sectional view illustrating the structure of an example of a cathode used in a rechargeable battery of the present invention, comprising at least a cathode, an anode, a separator, and an electrolyte comprising an alkali electrolyte solution.

A cathode 100 shown in FIG. 1 has a structure comprising an amorphous phase-bearing nickel hydroxide particulate 101 (hereinafter referred to as "amorphous nickel hydroxide particulate" or "amorphous nickel hydroxide particles") and a collector 102 having a porous structure with a number of pores wherein each of the pores of the collector 102 filled with the amorphous nickel hydroxide particulate 101. FIG. 1 includes cross-sectional image views (A) to (E) illustrating a particle comprising the amorphous nickel hydroxide particle filled in the pore of the collector 102.

As previously described, the amorphous nickel hydroxide particulate 101 has, in X-ray diffraction using Kα-rays of Cu as a radiation source, a diffraction peak of a (001) face appeared near a diffraction angle 2θ=19° having a half-value width of more than 1.2 and has a diffraction peak of a (101) face appeared near a diffraction angle 2θ=38° having a half-value width of more than 1.5°. The amorphous nickel hydroxide particulate is also featured that a crystallite size in a direction perpendicular to the (001) face and a crystallite size in a direction perpendicular to the (101) face which are calculated from the result of the X-ray diffraction are respectively less than 8 nm.

The amorphous nickel hydroxide particulate 101 filled in the pores of the collector 102 is preferred to comprise a composite comprising an amorphous nickel hydroxide particle having an undefined form with an irregular surface, a electrically conductive material and an additive. Particularly, the amorphous nickel hydroxide particulate 101 filled in the pore of the collector 102 may be any of configurations shown in the cross-sectional image views (A) to (E).

The configuration shown in the cross-sectional image view (A) comprises a composite comprising an amorphous nickel hydroxide particle 103 having an undefined form with an irregular surface containing a electrically conductive material 104 and an additive 105 such that they are partially combined therein.

The configuration shown in the cross-sectional image view (B) comprises a composite comprising an amorphous nickel hydroxide particle 106 having an undefined form with an irregular surface containing a electrically conductive material and an additive such that they are uniformly combined therein.

The configuration shown in the cross-sectional image view (C) comprises an amorphous nickel hydroxide particle 103 whose surface is covered by a cover layer 107 comprising an electrically conductive material or/and additive.

The configuration shown in the cross-sectional image view (D) comprises only an amorphous nickel hydroxide particle 103 having an undefined form with an irregular surface. In this case, the amorphous nickel hydroxide particle 103 is added with a electrically conductive material and an additive.

The configuration shown in the cross-sectional image view (E) comprises an amorphous nickel hydroxide particle 103 having an undefined form with an irregular surface which has a core portion comprising a crystalline nickel hydroxide particulate 108, where a clad comprising the amorphous nickel hydroxide is formed as a result that the crystalline nickel hydroxide 108 is partially amorphized. In this case, the particle is added with a electrically conductive material and an additive.

The electrically conductive material may comprises a metallic cobalt, a cobalt compound, or a mixture thereof. The cobalt compound can include cobalt monoxide, cobalt hydroxide, and the like. The electrically conductive material is once dissolved in the alkali electrolyte solution and forms an electrically conductive network on the surfaces of the amorphous nickel hydroxide particles when the rechargeable battery is subjected to initial charging.

The additive may comprise at least one kind of a metal compound selected from the group consisting of alkaline earth metal compounds, rare earth metal compounds, transition metal compounds of transition metal elements belonging to groups 4B, 5B, 6B, and 7B of the periodic table, and metal compounds of metal elements belonging to group 3A of the periodic table.

FIG. 2 is a schematic cross-sectional view illustrating the structure of another example of a cathode used in the rechargeable battery of the present invention. A cathode 200 shown in FIG. 2 comprises two active material layers 205 respectively formed on one of opposite surfaces of a collector 204. Each of the active material layers 205 is typically formed by fixing a mixture comprising the foregoing amorphous nickel hydroxide particulate 201, a crystalline nickel hydroxide particulate 202 and an electrically conductive auxiliary 203 onto one of the opposite surfaces of the collector 204 through a binder. As the amorphous nickel hydroxide particulate 201, a particulate having any of the configurations shown in the cross-sectional image views (A) to (E) of FIG. 1 may be used. The crystalline nickel hydroxide particulate 202 is preferred to have an average particle size which is greater than that of the amorphous nickel hydroxide particulate 201 and have a spherical form or a form similar to the spherical form. And the crystalline nickel hydroxide particulate 202 is preferred to comprise crystalline nickel hydroxide particles having a surface which is covered by an electrically conductive material.

In this embodiment, the active material layer 205 is formed on each of the opposite surfaces of the collector 204. However, it is possible that the active material layer 205 is formed only on one of the opposite surfaces of the collector 204.

A first feature of the present invention is that the specific amorphous phase-bearing nickel hydroxide particulate is used as the main component of the cathode, where γ-type nickel oxyhydroxide is effectively prevented from being generated upon over-charging, whereby the active-material utilization efficiency is improved and the lifetime of the cathode is prolonged. In addition, the addition of cadmium or zinc into a nickel hydroxide crystal which is essential in the prior art can be omitted, and the active material layer of the cathode can be made have a highly improved energy density.

A second feature of the present invention is that the specific amorphous phase-bearing nickel hydroxide particulate as the main component of the cathode is used in combination with the electrically conductive material and the additive which are other components of the cathode. When to combine the amorphous phase-bearing nickel hydroxide particulate, the electrically conductive material and the additive is carried out by a mechanically mixing method, amorphization of a prescribed nickel hydroxide into an amorphous phase-bearing nickel hydroxide particulate and addition of electrical conductivity thereto can be concurrently carried out, where the amorphization of the nickel hydroxide is readily performed. And the treating process in this case is relatively simple. In this respect, it is possible to diminish the production cost of a cathode. And the cathode produced has a high active-material utilization efficiency and a prolonged charging-and-discharging cycle life.

A third feature of the present invention is that the amorphous phase-bearing nickel hydroxide particulate and the crystalline nickel hydroxide particulate are together used, where the density of the active material layer of the cathode is improved to more improve the energy density of the active material.

Preparation of Amorphous Phase-Bearing Nickel Hydroxide Powder (Particulate):

The amorphization magnitude of nickel hydroxide may be determined, for instance, based on a half-value width of a diffraction peak intensity appeared in wide-angle X-ray diffraction analysis using Kα-rays of Cu as a radiation source. The half-value width is a value which indicates a width in a half height of the X-ray diffraction peak intensity. And it is meant that the larger the half-value width, the smaller the interplanar uniformity of a crystal, that is, the crystallinity is smaller. When a nickel hydroxide particulate corresponds this situation, it is determined to be of an amorphous nature.

The amorphization magnitude of nickel hydroxide may be also determined based on a crystallite size thereof. The crystallite means a primary particle capable of being considered as a single crystal in which the atomic arrangement order of crystal is maintained. And it is meant that the smaller the crystallite size, the smaller the crystallinity. When a nickel hydroxide particulate corresponds this situation, it is determined to be of an amorphous nature.

The crystallite size of a given particulate can be determined from the half-value width and the diffraction angle of the peak obtained in the wide-angle X-ray diffraction and in accordance with the following Scherrer's equation.

$$D_{hkl}=0.94\lambda/(\beta \cos \theta) \quad \text{[Scherrer's equation]}$$

$D_{hkl}$: a crystallite size (nm) in a direction perpendicular to a (hkl) face, λ: a wavelength of X-ray beam (the wavelength of the K α-rays of Cu=0.1540 nm), β: a half-value width (radian) of the peak, and θ: a Bragg angle (°) of the diffraction line.

Besides, the amorphization magnitude of nickel hydroxide may be also determined based on appearance of a halo pattern in electron diffraction analysts, disappearance of a lattice pattern in observation by a transmission electron microscope (TEM), or the presence or absence of a calorific peak due to crystallization in analysis by a differential scanning calorimeter (DSC).

Detailed description will be made of a case of nickel hydroxide. A nickel hydroxide crystal has a layer structure of a hexagonal system. The foregoing (001) face of lattice plane corresponds a plane in parallel to the layer constituting the layer structure and similarly, the (101) face corresponds a face which obliquely crosses the layer. When the half-value widths of the diffraction peaks corresponding these faces are large, this situation indicates that the layer structure is disordered and the range where the interlayer order is maintained is narrowed. That is, it means that the regular layer structure is maintained in terms of the short range order but it is not maintained in terms of the long range order.

Now, the amorphous phase-bearing nickel hydroxide particulate used in the present invention is that the crystal layer structure is disordered and therefore, it is considered such that the freedom of the proton shift at the solid-liquid interface with the electrolyte solution is improved, whereby the charging efficiency is improved as well as occurrence of γ-type nickel oxyhydroxide is effectively prevented upon over-charging, and as a result, deep charging is possible to be performed. In addition, even when γ-type nickel oxyhydroxide should be generated, it is considered that the γ-type nickel oxyhydroxide is not remained as an irreversible component but it is readily reduced into β-type nickel hydroxide by virtue of discharging. Additionally, the γ-type nickel oxyhydroxide generated is influenced to change the crystal structure only within the short range and therefore, the expansion of the active material layer of the cathode due to this influence by the γ-type nickel oxyhydroxide is relaxed. Separately, the amorphous phase-bearing nickel hydroxide particulate used in the present invention is not necessary to be added with cadmium or zinc. Thus, it is possible to form a cathode having a large capacity per unit weight.

Particularly, according to the present invention, by using a cathode comprising the amorphous phase-bearing nickel hydroxide particulate as a principal constituent, there can be attained an alkali rechargeable battery having a high active-material utilization efficiency and a high energy density and which excels in overcharge resistance and has a prolonged charging-and-discharging cycle life.

The amorphous phase-bearing nickel hydroxide particulate used in the present invention can be prepared, for instance, by a method wherein a prescribed nickel hydroxide powder is subjected to a mechanical grinding treatment (amorphization treatment) using a grinding apparatus such as planetary ball mill, tumbling ball mill, or vibration ball mill. There is no particular limitation for the starting nickel hydroxide power. For instance, it is possible to use a crystalline nickel hydroxide powder obtained by a conventional reaction crystallization method.

The mechanical grinding treatment is preferred to be conducted by using a planetary ball mill capable of applying a strong centrifugal force by a combination of rotation and revolution to a starting material, where amorphization of the material can be effectively performed for a short period of time.

In any case, the mechanical grinding treatment is preferred to be conducted in an atmosphere composed of an inert gas such as argon gas. However, depending upon grinding condition adopted, there is an occasion in that heat is reserved in the grinding vessel to cause chemical change in the material. For instance, when a nickel hydroxide powder is excessively engaged in the mechanical grinding treatment, there is an occasion in that a nickel oxide material having a poor electrode activity is generated due to dehydrogenation reaction. Therefore, depending on the kind of a starting material, it is preferred that the mechanical grinding treatment is conducted by using the planetary ball mill and other appropriate grinding apparatus in combination.

Figure 3:
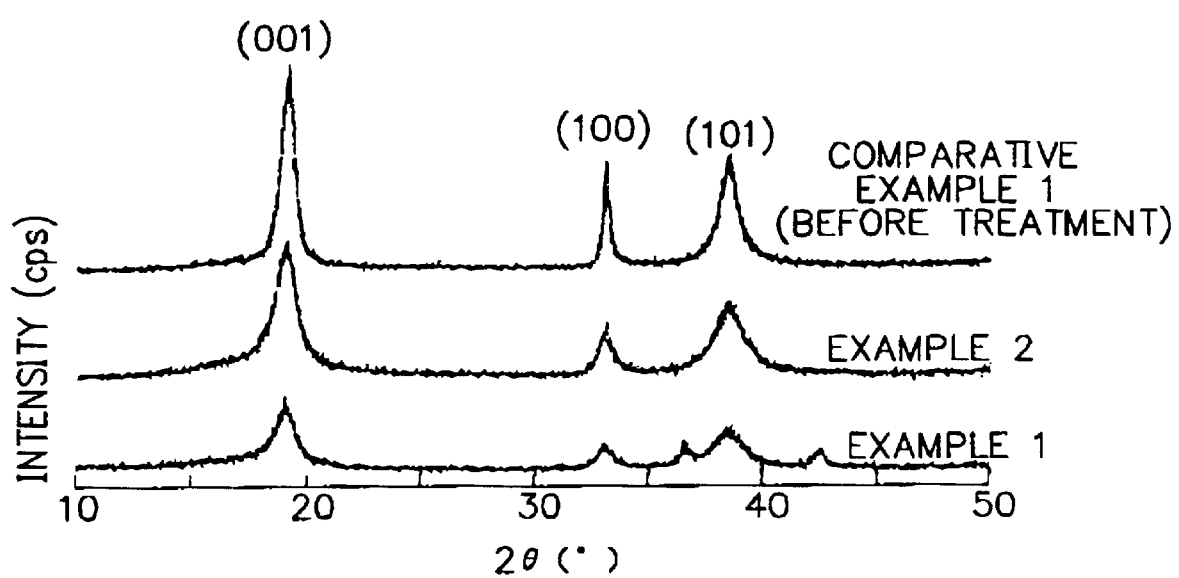
FIG. 3 collectively shows an X-ray diffraction chart of an amorphous phase-bearing nickel hydroxide particulate (powder) obtained in Example 1 which will be described later, an X-ray diffraction chart of an amorphous phase-bearing nickel hydroxide particulate (powder) obtained in Example 2 which will be described later, and an X-ray diffraction chart of a nickel hydroxide powder prior to subjecting to a treatment (amorphization) which is obtained in Comparative Example 1 which will be described later.

FIG. 3 collectively shows an X-ray diffraction chart of (a) an amorphous phase-bearing nickel hydroxide particulate (powder) obtained by way of the mechanical grinding treatment using planetary ball mill in Example 1 which will be described later, an X-ray diffraction chart of (b) an amorphous phase-bearing nickel hydroxide particulate (powder) obtained by way of the mechanical grinding treatment using planetary ball mill in Example 2 which will be described later, and an X-ray diffraction chart of (c) a nickel hydroxide powder prior to subjecting to a mechanical grinding treatment (amorphization) which is obtained in Comparative Example 1 which will be described later. As FIG. 3 illustrates, it is understood that when the nickel hydroxide powder (c) having an X-ray diffraction chart with narrow peaks is subjected to the mechanical grinding treatment, the nickel hydroxide powder (c) is amorphized into the amorphous phase-bearing nickel hydroxide particulate (a) or (b) having an X-ray diffraction chart with broad peaks. As shown in FIG. 3, each of the amorphous phase-bearing nickel hydroxide particulate (a) and the amorphous phase-bearing nickel hydroxide particulate (b) has a diffraction peak of a (001) face appeared near a diffraction angle 2θ=19° and a diffraction peak of a (101) face appeared near a diffraction angle 2θ=38°, where the half-value width of the former diffraction peak is smaller than that of the latter diffraction peak.

The X-ray diffraction chart of each of the amorphous phase-bearing nickel hydroxide particulate (a) and the amorphous phase-bearing nickel hydroxide particulate (b) has another identical diffraction peak near a diffraction angle 2θ=33° corresponding to a (100) face. This diffraction peak is smaller than each of the diffraction peak of the (001) face and the diffraction peak of the (101) face, and the half-value width of the diffraction peak of the (100) face is smaller than that of each of the diffraction peak of the (001) face and the diffraction peak of the (101) face.

Now, by the above-described mechanical grinding treatment (amorphization treatment), the nickel hydroxide powder is micronized to obtain an amorphous phase-bearing nickel hydroxide particulate (powder) comprising particles (fine particles) having an undefined form with an irregular surface and having a given average particle size. The average particle size of the amorphous phase-bearing nickel hydroxide particulate is changed depending upon the kind of a grinding apparatus used or the treating condition adopted (for instance, the intensity of the energy applied to the starting material). In the case where a nickel hydroxide powder having an average particle size of about 5 to about 30 μm obtained by a conventional reaction crystallization method is used as the starting material, when a mechanical energy required for the amorphization is applied to the nickel hydroxide powder, the average particle size is decreased to less than 2 μm. In other words, the crystallinity of the nickel hydroxide powder treated under gentle condition where the average particle size becomes to be beyond 2 μm is more or less around the same as that prior to the treatment. On the other hand, when the intensity of the mechanical energy applied is increased, the average particle size is further decreased. However, when the nickel hydroxide powder is micronized so that the average particle size becomes to be less than 0.2 μm, the inter-particle electron conductivity is decreased, resulting in a reduction in the active-material utilization efficiency. Further, when such powder is impregnated in a foamed metal porous body having a three-dimensional network structure as a collector to obtain a cathode, the powder is liable to miss from the collector. Therefore, the amorphous phase-bearing nickel hydroxide particulate used in the present invention is preferred to have an average particle size in a range of from 0.2 to 2 μm.

Here, description will be made of the average particle size. The average particle size can be obtained by measuring a particle size distribution, for instance, in accordance with a laser scattering method. The average particle size may be expressed by an arithmetic means obtained from the total particles, a mode size defined as a particle size in which the frequency distribution value becomes maximum (that is, the vertex of a particle size distribution graph), or a median size defined as a particle size which corresponds a 50% value (a central cumulative value) of a cumulative curve. The amorphous phase-bearing nickel hydroxide particulate used in the present invention affords a particle size distribution curve widened on a large particle size side due to a secondary aggregation in a particle size distribution graph in many cases. Therefore, the average particle size is expressed by aforesaid mode size. Separately, the average particle size of the amorphous phase-bearing nickel hydroxide particulate used in the present invention may be obtained on the basis of an image observed by a scanning electron microscope (SEM).

The amorphous phase-bearing nickel hydroxide particulate used in the present invention can be also prepared using a pulverizing mill in which rotation and revolution motions are imparted to grinding rings or a pulverizing mill comprising a milling vessel in which the rotating movement of a grinding roller or stator is utilized.

Besides, the amorphous phase-bearing nickel hydroxide particulate used in the present invention can be prepared by a chemical synthesis method using chemical reaction. As an example of such chemical synthesis method, there can be mentioned a method using a so-called sol-gel method in which a solution containing a prescribed nickel compound dissolved therein is added with a chelating agent and reacted to form a sol particulate, followed by being further reacted, whereby the sol particulate is gelated. The gel material obtained is reacted with an alkali to obtain an amorphous phase-bearing nickel hydroxide particulate. As preferable specific examples of the nickel compound, there can be mentioned nickel nitrate, nickel chloride, nickel carboxylate, and nickel alkoxide. As preferable specific examples of the chelating agent, there can be mentioned citric acid, tartaric acid, maleic acid, and acetylacetone.

Separately, the amorphous phase-bearing nickel hydroxide particulate used in the present invention can be prepared by a method wherein a solution containing a prescribed nickel compound dissolved therein is added with a surface-active agent at a concentration which is greater than a critical micelle concentration and is reacted with an alkali.

As preferable specific example of the nickel compound, there can be mentioned nickel nitrate, nickel chloride, and nickel sulfate. As preferable specific examples of the surface-active agent, there can be mentioned nonionic series surface-active agents. Composite comprising the amorphous phase-bearing nickel hydroxide particulate, an electrically conductive material, and an additive:

As previously described, the component of the cathode includes, other than the collector, the foregoing amorphous phase-bearing nickel hydroxide particulate (a) (if necessary, and the foregoing crystalline nickel hydroxide particulate), an electrically conductive material (b) and an additive (c). The electrically conductive material (b) can include a metallic cobalt and cobalt compounds such as cobalt monoxide, cobalt hydroxide, and the like. The additive (c) can include alkaline earth metal compounds, rare earth metal compounds, transition metal compounds of transition metal elements belonging to groups 4B, 5B, 6B, and 7B of the periodic table, and metal compounds of metal elements belonging to group 3A of the periodic table.

The electrically conductive material (b) contained in the active material or the active material layer of the cathode is once dissolved in the alkali electrolyte solution and it is oxidized upon initial charging to deposit as a highly conductive cobalt oxyhydroxide on the surface of the amorphous phase-bearing nickel hydroxide particulate (a) while forming a conductive network thereon.

The additive (c) functions to increase an oxygen overvoltage upon charging. The potential region for the oxidation reaction of the amorphous phase-bearing nickel hydroxide particulate (a) is proximate to an oxygen generation potential and because of this, competition with generation of an oxygen gas as a side reaction product is occurred at the last stage of the charging. However, the use of the additive (c) prevents the generation of the oxygen gas to improve the charging efficiency, where the effect of preventing the occurrence of γ-type nickel oxyhydroxide is promoted. As a result, the active-material utilization efficiency is more improved. Especially, when the charging is performed under high temperature condition, the effect becomes significant. Further, the additive (c) also functions to prevent generation of oxygen liberated due to reaction of the cathode active material with water when the rechargeable battery is maintained in a charged state and therefore, it is effective also in improving the self-discharging performance.

It is preferred that the amorphous phase-bearing nickel hydroxide particulate (a) is combined with the electrically conductive material (b) or/and the additive (c) into a composite. For instance, in the case where a nickel hydroxide powder prior to amorphization is mixed with the electrically conductive material (b) and the additive (c) and the mixture is subjected to a mechanical mixing treatment, there can be obtained an amorphous phase-bearing particulate whose surfaces are covered by the electrically conductive material (b or/and the additive (c) or a composite comprising an amorphous phase-bearing particulate combined with the electrically conductive material (b) or/and the additive (c). Thus, the amorphization of the nickel hydroxide powder and the addition of electrical conductivity can be concurrently performed. In this respect, the production process is simplified, resulting in a reduction in the production cost of a rechargeable battery. Separately, by mixing the different materials in this way, there is afforded an advantage in that the nickel hydroxide powder is more easily amorphized.

In the case where a metallic cobalt or a cobalt compound is used as the electrically conductive material (b), depending upon mixing condition adopted, there is an occasion in that part of the electrically conductive material (b) is oxidized into a tricobalt tetraoxide having a spinel structure. This tricobalt tetraoxide is poor in terms of the volubility to the alkali electrolyte solution and because of this, it hinders the oxidation reaction to form a highly conductive cobalt oxyhydroxide upon the initial charging, where the formation of the highly conductive network becomes incomplete, resulting a reduction in the active-material utilization efficiency. However, by mixing the additive (c) together with the electrically conductive material (b) with the nickel hydroxide powder, the generation of the tricobalt tetraoxide when the mixture is engaged in the mechanical mixing treatment can be prevented, where the highly conductive network is desirably formed upon the initial charging, resulting an improvement in the active-material utilization efficiency.

Besides, the surface coating of the amorphous-phase bearing nickel hydroxide particulate (a) (and the crystalline nickel hydroxide particulate which is used if required) by the electrically conductive material (b) may be performed by a chemical method. Specifically, the amorphous phase-bearing nickel hydroxide particulate (a) is dispersed in a treating solution containing at least a prescribed cobalt salt dissolved therein, followed by being reacted with at least one kind of a compound selected from the group consisting of potassium hydroxide, sodium hydroxide, and lithium hydroxide. As preferable specific examples of the cobalt salt, there can be mentioned cobalt sulfate, cobalt nitrate, and cobalt chloride. In this case, It is possible for the treating solution to additionally contain at least one kind of a metal compound selected from the group consisting of alkaline earth metal compounds, rare earth metal compounds, transition metal compounds of transition metal elements belonging to groups 4B, 5B, 6B, and 7B of the periodic table, and metal compounds of metal elements belonging to group 3A of the periodic table.

According to this method, there is also afforded an advantage in that the oxygen overvoltage is increased to improve the charging efficient, where the effect of preventing the occurrence of γ-type nickel oxyhydroxide is more improved.

Separately, the surface coating of the amorphous-phase bearing nickel hydroxide particulate (a) by the electrically conductive material (b) may be also performed by a method wherein the amorphous-phase bearing nickel hydroxide particulate (a) is mixed with a cobalt salt capable of being decomposed at a temperature which is lower than the decomposition temperature of the nickel hydroxide and the mixture is heated to a temperature at which the cobalt salt is decomposed, whereby an electrically conductive coat layer can be formed on the surface of the amorphous-phase bearing nickel hydroxide particulate. As the cobalt salt, cobalt nitrate is preferable. When the resultant obtained in this case is immersed in a solution containing at least one kind of a compound selected from the group consisting of potassium hydroxide, sodium hydroxide, and lithium hydroxide dissolved therein, followed by subjecting to a heat treatment in the presence of oxygen, an alkali metal can be incorporated in the coat layer to make the coat layer to be highly conductive.

The amount of the electrically conductive material (b) to be added should be controlled so that the foregoing effects are provided and the relative content of the nickel hydroxide in the active material or the active material layer of the cathode is excessively decreased. A preferable addition amount of the electrically conductive material (b) is in a range of from 5 to 20 wt. % versus the total amount of the components of the the active material or the active material layer of the cathode.

The alkaline earth metal compound as the additive (c) can include oxides and hydroxides of calcium (Ca), oxides and hydroxides of magnesium (Mg), oxides and hydroxides of strontium (Sr), and oxides and hydroxides of barium (Ba). The rare earth metal compound as the additive (c) can include oxides and hydroxides of yttrium (Y), oxides and hydroxides of holmium (Ho), oxides and hydroxides of erbium (Er), oxides and hydroxides of thulium (Tm), oxides and hydroxides of ytterbium (Yb), and oxides and hydroxides of lutetium (Lu). The transition metal compound as the additive (c) can include oxides and hydroxides of titanium (Ti), oxides and hydroxides of vanadium (V), oxides and hydroxides of chromium (Cr), and oxides and hydroxides of manganese (Mg). The group 3A compound as the additive (c) can include oxides and hydroxides of aluminum (Al), oxides and hydroxides of gallium (Ga), and oxides and hydroxides of indium (In). Of these metal compounds as the additive (c), oxides and hydroxides of yttrium (Y), oxides and hydroxides of ytterbium (Yb), oxides and hydroxides of calcium (Ca), and oxides and hydroxides of aluminum (Al) are particularly preferable.

These metal compounds as the additive (c) are inferior in terms of the conductivity, the addition of any of these metal compounds in an excessive amount decreases the active-material utilization efficiency. A preferable addition amount of the additive (c) which makes it possible to attain the foregoing effects is in a range of from 1 to 5 wt. % versus the total amount of the components of the active material or the active material layer of the cathode.

Improvement of Density of the Cathode Active Material:

The principal component of the active material (or the active material layer) of the cathode may comprise a mixture of the foregoing amorphous phase-bearing nickel hydroxide particulate and the foregoing crystalline nickel hydroxide particulate.

By admixing the crystalline nickel hydroxide particulate with the amorphous phase-bearing nickel hydroxide particulate, the packing density of the active material (or the density of the active material layer) of the cathode is improved to heighten the capacity of the cathode. Here, the term "packing density" is used in the case of using a porous metal body as the cathode collector and it is meant the density for the cathode active material impregnated in the porous structure of the porous metal body.

The above-described situation is attributed to a reason that when the crystallinity of nickel hydroxide is increased, the specific surface area is decreased and the apparent density is increased. In order to pack the cathode active material at a higher density or in order to make the cathode active material layer have a higher density, the apparent density is preferred to be 2 g/cc or more. For this purpose, the crystalline nickel hydroxide particulate is preferred to comprise a crystalline nickel hydroxide particulate which in X-ray diffraction using Kα-rays of Cu as a radiation source, has a diffraction peak of a (001) face appeared near a diffraction angle 2θ=19° having a half-value width of less than 0.8° and has a diffraction peak of a (101) face appeared near a diffraction angle 2θ=38° having a half-value width of less than 1.1°.

In addition, the crystalline nickel hydroxide particulate is preferred to comprises particles in a spherical form or a form approximate to the spherical form. Further, the crystalline nickel hydroxide particulate is preferred to have an average particle size which is preferably 5 times or more or more preferably 10 times or more the average particle size of the amorphous phase-bearing nickel hydroxide particulate.

Incidentally, as previously described, a foamed metal porous body is preferably used as the cathode collector. This foamed metal porous body has a number of small pores having an average diameter of about 100 μm.

From this point, the crystalline nickel hydroxide particulate is preferred to have an average particle size of less than 30 μm.

Thus, the crystalline nickel hydroxide particulate is preferred to have an average particle size in a range of from 5 to 30 μm.

Now, the crystalline nickel hydroxide particulate is inferior to the amorphous phase-bearing nickel hydroxide particulate in terms of the active-material utilization efficiency. Therefore, when the mixing ratio of the crystalline nickel hydroxide particulate is increased, the packing density of the cathode active material is improved but a drawback is entailed in that the capacity of the cathode is difficult to be increased. And when the mixing ratio of the crystalline nickel hydroxide particulate exceeds 70%, not only the packing density is decreased but also the effects by the amorphous phase-bearing nickel hydroxide particulate are remarkably impaired. Therefore, the mixing ratio of the crystalline nickel hydroxide particulate is preferred to be in a range of from 10 to 70 wt. % versus the total amount of the components of the cathode active material layer.

The crystalline nickel hydroxide particulate may contain at least one kind of an element selected from the group consisting of Zn, Mg, and Ba in a solid solution state.

The volume change (due to expansion and shrinkage) of the cathode active material layer upon the repetition of the charging-and-discharging cycle tends to increase as the content proportion of the crystalline nickel hydroxide particulate in the cathode active material layer is increased. However, by the addition of aforesaid element, this situation of the volume change can be refrained.

Preparation of Cathode:

As a typical example of a method of preparing the cathode used in a rechargeable battery of the present invention which comprises at least a cathode, an anode, a separator, and an electrolyte comprising an alkali electrolyte solution, there can be mentioned a method wherein a mixture principally comprising the foregoing amorphous phase-bearing nickel hydroxide particulate and the foregoing crystalline nickel hydroxide particulate is mixed with a prescribed electrically conductive material and a prescribed additive if required, followed by being kneaded with a binder solution to obtain a paste, the paste is impregnated in a collector (102) having a porous structure that the pores of the collector are filled with the paste. Besides, there can be mentioned a method wherein a mixture principally comprising the foregoing amorphous phase-bearing nickel hydroxide particulate and the foregoing crystalline nickel hydroxide particulate is mixed with a prescribed electrically conductive material and a prescribed additive if required, followed by being fixed onto a surface of a collector (204) through a binder to form an active material layer on the surface of the collector. The mixture applied on the collector may contain an electrically conductive auxiliary if required. In this case, the active material layer may be formed on each of the opposite surfaces of the collector (204).

The collector (102, 204) functions to supply an electric current such that said electric current can be efficiently consumed for the electrode reaction upon charging and discharging and it also functions to collect an electric current generated. Therefore, it is preferred for the collector to comprise a material having a high conductivity and which is inactive to the battery reaction. As such material, there can be mentioned, for example, a foamed metal porous body obtained by covering a polymer sheet comprising an urethane foam or the like and having a three-dimensional network structure by a metal film of nickel or the like by means of plating or the like and sintered the sheet to decompose and remove the resin components of the sheet, a metal porous body obtained by covering a carbon fiber felt by a metal film of nickel or the like by means of plating, and an unwoven member formed from a metal fiber of nickel or the like. Besides, there can be mentioned, for example, punching metal members, expanded metal members and metal foils respectively comprising nickel materials or nickel-plated metallic materials.

The foregoing electrically conductive auxiliary can include a powdery nickel material, a powdery copper material, and amorphous carbon materials such as acetylene black, ketjen black, and the like.

The electrically conductive auxiliary is preferred to be in a spherical form, a flake form, a filament form, a spike form, a needle form, and a form comprising a combination of these forms.

The foregoing binder can include organic polymers which are water-soluble or water-insoluble. However, it is preferred to use a water-soluble organic polymer as the binder. Specific examples are polyvinyl alcohol; polyvinyl chloride; polyolefin series resins such as polyethylene, and polypropylene; fluorine series resins such as polyvinylidene fluoride and tetrafluoroethylene polymer; and celluloses such as methyl cellulose and carboxymethyl cellulose. Of these, methyl cellulose, carboxymethyl cellulose, and polyvinyl alcohol are particularly preferable.

Now, it is preferred that after a rechargeable battery is produced using the cathode formed as above described, an anode, a separator, and an alkali electrolyte solution, the rechargeable battery is over-charged so that the rechargeable battery is charged with an electricity quantity corresponding to 200% or more of the capacity of the cathode, and thereafter, for the rechargeable battery thus over-charged, discharging is preformed until the voltage of the rechargeable battery reaches a prescribed battery voltage. This operation is conducted at least one or more times. In this operation, the charging and the discharging are deeply performed while preventing γ-type nickel oxyhydroxide from being generate. Because of this, the nickel hydroxide contained in the cathode is effectively activated, whereby the active-material utilization efficiency of the cathode in the successive charging-and-discharging cycles following the above operation is improved.

Anode:

The anode used in the rechargeable battery of the present invention may be a hydrogen storage alloy electrode comprising a hydrogen storage alloy material, a zinc electrode comprising a zinc metal material, or a cadmium electrode comprising a cadmium metal material. The hydrogen storage alloy material can include alloy materials comprising MmNi$_5$-series alloy whose Ni being partly substituted by Mn, Al and Co, transition metal series alloy materials such as Zn—Ti—Ni—V—Cr—Co—Mn alloy, magnesium-nickel alloy materials, and bcc type solid-solution alloy materials. Such hydrogen storage alloy material can be prepared by means of high frequency fusion, arc fusion, gas atomization, sputtering, mechanical alloying, or molten salt electrolysis. A hydrogen storage alloy electrode comprising such hydrogen storage alloy material as the anode may be formed, for instance, by a method of sintering a mixture comprising the hydrogen storage alloy material and an electrically conductive auxiliary on a surface of or each of opposite surfaces of an anode collector or a method of fixing a mixture comprising the hydrogen storage alloy material, an electrically conductive auxiliary and a binder on a surface of or each of opposite surfaces of an anode collector.

A zinc electrode comprising a zinc metal material as the anode may be formed, for instance, by a method of fixing a sheet formed by mixing a metallic zinc powder with a zinc oxide powder to obtain a mixture and adding a binder to the mixture on a surface of or each of opposite surfaces of an anode collector.

A cadmium electrode comprising a cadmium metal material as the anode may be formed, for instance, by a method wherein a substrate obtained by sintering a perforated thin steel plate having a number of perforations and which is applied with a nickel powder is provided as an anode collector, the substrate is immersed in a cadmium ion-containing solution to precipitate cadmium salts in the perforations of the substrate, the resultant is reacted with an alkali solution, followed by subjecting to a formation treatment.

As well as the cathode collector, the anode collector is preferred to comprise a material having a high conductivity and which is inactive to the battery reaction. As such material, there can be mentioned, for example, a foamed metal porous body obtained by covering a polymer sheet comprising an urethane foam or the like and having a three-dimensional network structure by a metal film of nickel or the like by means of plating or the like and sintered the sheet to decompose and remove the resin components of the sheet, a metal porous body obtained by covering a carbon fiber felt by a metal film of nickel or the like by means of plating, and an unwoven member formed from a metal fiber of nickel or the like. Besides, there can be mentioned, for example, punching metal members and expanded metal members respectively comprising nickel or nickel-plated metallic materials, and metal foils. Separately, it is possible to such sintered substrate as above described as the anode collector.

The foregoing electrically conductive auxiliary can include a powdery nickel material, a powdery copper material, a powdery silver material, a powdery indium material, and a powdery tin material. Besides, amorphous carbon materials such as acetylene black, ketjen black, and the like are also usable as the electrically conductive auxiliary.

The electrically conductive auxiliary is preferred to be in a spherical form, a flake form, a filament form, a spike form, a needle form, and a form comprising a combination of these forms.

The foregoing binder can include organic polymers which are water-soluble or water-insoluble. However, it is preferred to use a water-soluble organic polymer as the binder. Specific examples are polyvinyl alcohol; polyvinyl chloride; polyolefin series resins such as polyethylene, and polypropylene; fluorine series resins such as polyvinylidene fluoride and tetrafluoroethylene polymer; and celluloses such as methyl cellulose and carboxymethyl cellulose. Of these, methyl cellulose, carboxymethyl cellulose, and polyvinyl alcohol are particularly preferable.

Electrolyte:

As the electrolyte used in the rechargeable battery of the present invention, in general, an electrolyte solution obtain by dissolving a prescribed electrolyte in water is used by retaining it in a separator having a porous structure. As preferable specific examples of the electrolyte, there can be mentioned potassium hydroxide, lithium hydroxide, and sodium hydroxide.

Of these, potassium hydroxide has an advantage in that an aqueous solution thereof exhibits a high ion conductivity. And lithium hydroxide and sodium hydroxide have an advantage in that they contribute to improving the charging efficiency under high temperature condition. Therefore, an aqueous solution containing potassium hydroxide as a main component and lithium hydroxide or sodium hydroxide as a minor component is particularly suitable as the electrolyte solution.

Now, it is known that a rechargeable battery whose cathode active material comprising nickel hydroxide can be more deeply charged when an alkali electrolyte solution containing an electrolyte at a high concentration but on the other hand, $\gamma$-type nickel oxyhydroxide is liable to generate in this case. In this respect, the concentration of an alkali electrolyte solution which is generally used in a rechargeable battery is approximately in a range of from 6 to 7 mol/l in the case of using potassium hydroxide as the electrolyte.

For the rechargeable battery of the present invention in which the amorphous phase-bearing nickel hydroxide particulate is used as the cathode active material, even when it is charged using an alkali electrolyte solution containing an electrolyte at a high concentration which is beyond 7 mol/l, $\gamma$-type nickel oxyhydroxide is effectively prevented from being generated, where the charging still can be more deeply performed and there can be attained an improvement in the active-material utilization efficiency. In the present invention, the concentration of the electrolyte solution is preferred to be heightened within a range where the ion conductivity is not remarkably decreased. A preferable range of the concentration of the electrolyte solution is from 8 to 12 mol/l.

In order to prevent leakage of the electrolyte solution, it is desired to use the electrolyte solution by gelling it by a gelling agent into a state with no flowability. As the gelling agent, it is desired to use a polymer having a property of absorbing the solvent of the electrolyte solution to swell. Said polymer can include polyethylene oxide, polyvinyl alcohol, and polyacrylamide.

Separator:

The separator is disposed between the anode and the cathode, and it serves to prevent the anode and the cathode from suffering from internal-shorts. It also serves to retain an electrolyte (or an electrolyte solution) therein depending upon the situation. The separator having the electrolyte retained therein functions as an ion conductor.

The separator is required to have a structure having a number of micropores capable of allowing ion to pass therethrough and it is also required to be insoluble into and stable to the electrolyte solution. The separator is preferred to be constituted by a nonwoven fabric or a memberane having a micropore structure, made of a polyolefin such as polypropylene, polyethylene or the like, a fluororesin, or a polyamide. In the case of a separator constituted by a polyolefin or a fluororesin, the separator is preferred to be applied with hydrophilic treatment in order to improve its wettability with the electrolyte solution. The hydrophilic treatment can include treatment by irradiation of a plasma such as hydrogen plasma, oxygen plasma, or fluorine plasma, treatment by irradiation of ozone, and corona discharge treatment. Besides, treatment by a chemical reagent such as an acid is also usable.

Separately, the separator may be constituted by a metal oxide film or a resin film combined with a metal oxide, respectively having a number of micropores.

Shape and Structure of Rechargeable Battery:

The rechargeable battery of the present invention may be in the form of a flat round shape, a cylindrical shape, a prismatic shape, or a sheet-like shape. The structure of the rechargeable battery of the present invention may takes a single layer structure, a multi-layered structure, a spiral-wound cylindrical structure, or the like. In the case where the rechargeable battery is of a spiral-wound cylindrical structure, the anode, separator, and cathode are arranged in the named order and they are spiral-wound and because of this, it has advantages such that the battery area can be increased as desired and a high electric current can be flown upon charging and discharging. In the case where the rechargeable battery is of a prismatic structure or a sheet-like structure, there is an advantage in that the space of a device for housing the rechargeable battery can be effectively utilized.

In the following, the shape and structure of a rechargeable battery of the present invention will be detailed with reference to FIGS. 4 to 6.

FIG. 4 is a schematic cross-sectional view illustrating an example of a single-layer flat round type (coin type) rechargeable battery according to the present invention. FIG. 5 is a schematic cross-sectional view illustrating an example of a spiral-wound cylindrical type rechargeable battery according to the present invention. FIG. 6 is a schematic perspective view illustrating an example of a prismatic rechargeable battery according to the present invention. These rechargeable batteries are basically of the same constitution and comprise a cathode, an anode, a separator with an electrolyte, a battery housing, output terminals, and the like.

Figure 5:
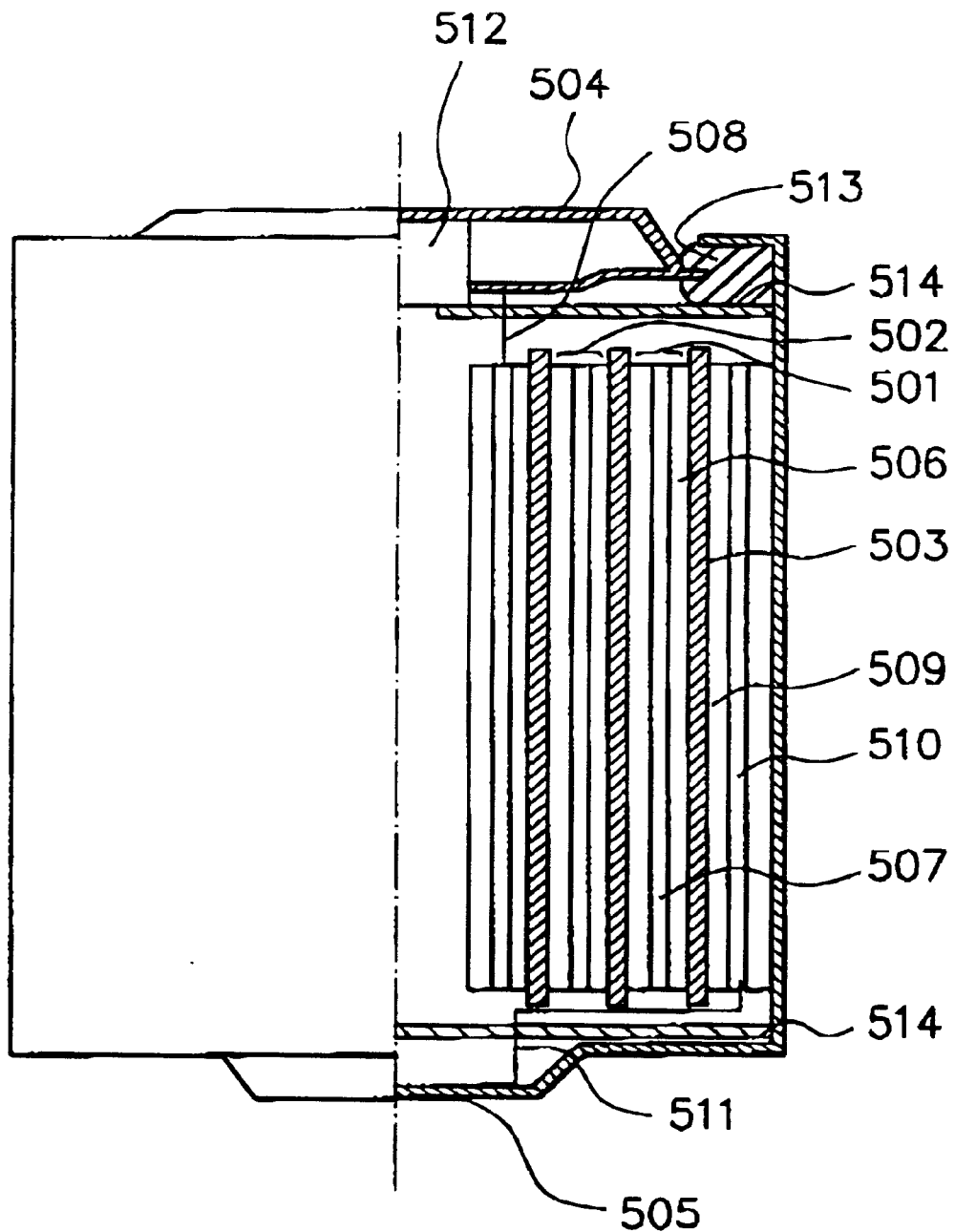
FIG. 5 is a schematic cross-sectional view illustrating an example of a spiral-wound cylindrical rechargeable battery according to the present invention.

In FIGS. 4 to 6, each of reference numerals 401, 501 and 601 indicates a cathode comprising a cathode active material layer; each of reference numerals 402, 502 and 602 an anode comprising an anode active material layer; each of reference numerals 403, 503 and 603 a separator with an electrolyte; each of reference numerals 404, 504 and 604 a cathode terminal (a cathode can or a cathode cap): each of reference numerals 405, 505 and 605 an anode terminal (an anode cap or an anode can); reference numeral 606 a battery housing; reference numeral 506 a cathode active material layer; reference numeral 507 a cathode collector: reference numeral 508 a cathode lead; reference numeral 509 an anode active material layer; reference numeral 510 an anode collector; reference numeral 511 an anode lead: each of reference numerals 512 and 607 a safety vent: each of reference numerals 406 and 513 a gasket; and reference numeral 514 an insulating plate.

[Battery Housing]

In FIGS. 4 and 5, the cathode can or the anode can (404, 505) and the anode cap or the cathode cap (405, 504) together serve as a battery housing. The battery housing is preferred to comprise a steel sheet or a stainless steel sheet. Besides, it may comprise a titanium clad stainless steel sheet, a copper clad stainless steel sheet or a nickel plating steel sheet. In the case of FIG. 6, the battery housing (606) is independently provided. The battery housing (606) may comprise a stainless steel, a metal such as zinc, a plastic such as polypropylene, or a composite comprising a metal or a glass fiber and a plastic.

[Safety Vent]

In the rechargeable battery of the present invention, a safety vent (512, 607) is provided in order to ensure the safety when the internal pressure in the battery is increased. The safety vent may comprise a rubber, a spring, a metal ball or a rupture foil.

[Insulating Packing]

The gasket (406, 513) may be constituted by a fluororesin, a polyamide resin, a polysulfone resin, or a rubber material. The sealing of the battery may be conducted by way of glass-sealing, sealing using an adhesive, welding or soldering, besides the caulking using the insulating packing as shown in FIG. 4 or FIG. 5.

The insulating plate (514) shown in FIG. 5 may be constituted by a material selected from organic resin materials and ceramics.

In the following, the present invention will be described in more detail with reference to examples. It should be understood that these examples are only for illustrative purposes and are not the scope of the present invention.

In each of the following examples, a spiral-wound cylindrical type rechargeable battery was prepared. However, this is not limitative. It is a matter of course to say that the present invention can be desirably adopted also in the preparation of other rechargeable batteries.

EXAMPLE 1

In this example, a spiral-wound cylindrical type rechargeable battery having such configuration as shown in FIG. 5 was prepared in the following manner.

1. Preparation of Cathode:

(1) Preparation of Nickel Hydroxide Powder:

A powdery nickel hydroxide material as the starting material was prepared by a conventional reaction crystallization method in the following manner.

An aqueous solution of nickel sulfate with a prescribed content was added with ammonium sulfate. An aqueous solution of sodium hydroxide was dropwise added to the nickel sulfate aqueous solution while controlling the pH value thereof to a pH value of 11 under condition of vigorously stirring the nickel sulfate aqueous solution to obtain a precipitate. The resultant precipitate was washed with pure water and dried to obtain a nickel hydroxide powder (particulate) comprising particles having a spherical form.

Using a X-ray diffraction device RINT 2000 (produced by Kabusiki Kaisha RIGAKU), a sample of the resultant nickel hydroxide powder was subjected to wide angle X-ray diffraction analysis using K$\alpha$-rays of Cu as a radiation source, which gave a diffraction peak of a (001) face appeared near a diffraction angle $2\theta=19°$ having a half-value width of 0.63° and a diffraction peak of a (101) face appeared near a diffraction angle $2\theta=38°$ having a half-value width of 1.01°. The presence of these peaks having a narrow half-value width indicates that the nickel hydroxide powder does not have amorphous phase. Calculation was carried out on the basis of the half-value widths and the diffraction angles of these peaks and in accordance with the foregoing Scherrer's equation. As a result, there were obtained a crystallite size of 13.9 nm and another crystallite size of 10.6 nm. Separately, using a laser scattering particle size distribution analyzer LA-920 (produced by Kabushiki Kaisha HORIBA Seisakusho), a sample of the resultant nickel hydroxide powder was subjected to analysis with respect to its particle size distribution by dispersing the sample in water through ultrasonic irradiation. As a result, the nickel hydroxide powder was found to have an average particle size of 10.3 µm.

(2) Preparation of Cathode Electrode Material:

86 wt. % of the nickel hydroxide powder obtained in the above (1). 12 wt. % of a cobalt monoxide powder and 2 wt. % of a yttrium oxide powder were mixed to obtain a powdery mixture. The resultant powdery mixture and rigid grinding balls were together introduced into a planetary ball mill grinding apparatus, where the powdery mixture was subjected to a grinding treatment in an argon atmosphere at an acceleration of 15 G for 10 minutes to obtain a powder. The resultant powder was subjected to an ultrasonic dispersion treatment in pure water, followed by drying, to obtain an amorphous nickel hydroxide powder (particulate) combined with cobalt monoxide and yttrium oxide.

Using the X-ray diffraction device RINT 2000, a sample of the resultant powder was subjected to wide angle X-ray diffraction analysis using K$\alpha$-rays of Cu as a radiation source, which afforded an X-ray diffraction chart shown in FIG. 3 which has a broad diffraction peak of a (001) face appeared near a diffraction angle $2\theta=19°$ having a half-value width of 1.43° and a broad diffraction peak of a (101) face appeared near a diffraction angle $2\theta=38°$ having a half-value width of 1.99°. The presence of these peaks having a wide half-value width indicates that the powder has amorphous phase.

Calculation was carried out on the basis of the half-value widths and the diffraction angles of these peaks and in accordance with the foregoing Scherrer's equation. As a result, there were obtained a crystallite size of 6.1 nm and another crystallite size of 5.3 nm. Separately, using the laser scattering particle size distribution analyzer LA-920, a sample of the resultant powder was subjected to analysis with respect to its particle size distribution by dispersing the sample in water through ultrasonic irradiation. As a result, the powder was found to have an average particle size of 0.99 µm. Further, an apparent density (a tap density) of the resultant power was measured by a manner wherein a prescribed amount of a sample of the resultant powder is introduced into a measuring cylinder, the measuring cylinder is sealed, the measuring cylinder is tapped 100 times, and thereafter a volumetric capacity of the sample is measured. As a result, the resultant powder was found to have an apparent density (a tap density) of 1.87 g/cc. In addition, a sample of the resultant powder was subjected to measurement with respect to its specific surface area by means of Brunauer-Emmett-Teller (BET) method using gas adsorption. As a result, the resultant powder was found to have a specific surface area of 21.6 m$^2$/g.

The results obtained are collectively shown in Table 1.

(3) Preparation of Cathode 501:

The amorphous nickel hydroxide powder combined with cobalt monoxide and yttrium oxide obtained in the above (2) was mixed with an aqueous solution containing 0.5 wt. % of carboxymethylcellulose as a binder to obtain a paste-like product. The paste-like product was impregnated in a 1.5 mm thick foamed nickel porous body of 400 g/m$^2$ having an average pore size of 100 µm and a porosity of 95% as a cathode collector, followed by drying at 80° C. for one hour. The resultant was subjected to press-forming by means of a roll pressing machine to obtain an electrode structural body having a thickness of 0.75 mm. The electrode structural body was cut to have a prescribed size. And a lead comprising a nickel foil tub was connected to the resultant by way of spot-welding. Thus, there was obtained a cathode 501.

2. Preparation of Anode 502:

99 wt. % of a MmNi$_5$-series hydrogen storage alloy powder and 1 wt. % of a nickel powder were mixed to obtain a mixture. The mixture was mixed with an aqueous solution containing 0.5 wt. % of methyl cellulose as a binder to obtain a paste-like product. The paste-like product was applied onto a nickel-plated punching metal having a thickness of 100 µm as an anode collector, followed by drying at 80° C. for one hour. The resultant was subjected to press-forming by means of a roll pressing machine to obtain an electrode structural body having a thickness of 0.35 mm. The electrode structural body was cut to have a prescribed size. And a lead comprising a nickel foil tub was connected to the resultant by way of spot-welding. Thus, there was obtained an anode 502.

3. Provision of Electrolyte Solution:

There was provided an aqueous solution containing 0.8 mol/l of lithium hydroxide and 10 mol/l of potassium hydroxide as an electrolyte solution.

4. Provision of Separator 503:

There was provided a polypropylene unwoven fabric member applied with hydrophilic treatment having a number of micropores as a separator 503.

By introducing the electrolyte solution at a later stage, the electrolyte solution becomes to retain in the micropores of the separator, where the separator having the electrolyte solution therein functions as the ion conductor.

5. Fabrication of a Rechargeable Battery Having Such Configuration as Shown in FIG. 5:

(i). The separator 503 was sandwiched between the cathode 501 and the anode 502 such that the separator was partly protruded at each end side, followed by spirally winding about a given axis so as to form a structure of the separator/the cathode/the separator/the anode/the separator. The resultant was inserted in an anode can 505 made of a titanium clad stainless steel.

(ii). The anode lead was spot-welded to a bottom portion of the anode can. Then, a necking was formed at an upper portion of the anode can by means of a necking apparatus, and the cathode lead was welded to a cathode cap 504 provided with a gasket 513 made of polypropylene by means of an ultrasonic welding machine.

(iii). The electrolyte solution was introduced into the resultant obtained in the above (ii), followed by putting the cathode cap 504 thereon, and the cathode cap and the anode can 505 were caulked by a caulking machine.

Thus, there was obtained a spiral-wound cylindrical type rechargeable battery.

This rechargeable battery was made to be of a cathode capacity-controlled type in that the anode capacity was made to be larger than the cathode capacity.

EXAMPLE 2

The procedures of Example 1 were repeated, except that the step 1-(2) and the step 1-(3) in Example 1 were conducted as will be described below, to obtain a spiral-wound cylindrical type rechargeable battery.

Preparation of Cathode Electrode Material:

The nickel hydroxide powder obtained in the step 1-(1) of Example 1 and rigid grinding balls were together introduced into a planetary ball mill grinding apparatus, where the nickel hydroxide powder was subjected to a grinding treatment in an argon atmosphere at an acceleration of 15 G for 10 minutes to obtain a powder. The resultant powder was subjected to an ultrasonic dispersion treatment in pure water, followed by drying, to obtain an amorphous nickel hydroxide powder (particulate).

Using the X-ray diffraction device RINT 2000, a sample of the resultant powder was subjected to wide angle X-ray diffraction analysis using Kα-rays of Cu as a radiation source, which afforded an X-ray diffraction chart shown in FIG. 3 which has a broad diffraction peak of a (001) face appeared near a diffraction angle 2θ=19° having a half-value width of 1.22° and a broad diffraction peak of a (101) face appeared near a diffraction angle 2θ=38° having a half-value width of 1.54°. The presence of these peaks having a wide half-value width indicates that the powder has amorphous phase. Calculation was carried out on the basis of the half-value widths and the diffraction angles of these peaks and in accordance with the foregoing Scherrer's equation. As a result, there were obtained a crystallite size of 7.5 nm and another crystallite size of 6.6 nm. Separately, using the laser scattering particle size distribution analyzer LA-920, a sample of the resultant powder was subjected to analysis with respect to its particle size distribution by dispersing the sample in water through ultrasonic irradiation. As a result, the powder was found to have an average particle size of 1.07 μm. Further, an apparent density (a tap density) of the resultant powder was measured in the same manner as in Example 1. As a result, the resultant powder was found to have an apparent density (a tap density) of 1.81 g/cc. In addition, a specific surface area of the resultant powder was measured in the same manner as in Example 1. As a result, the resultant powder was found to have a specific surface area of 19.4 m²/g.

The results obtained are collectively shown in Table 1.

Preparation of Cathode 501:

86 wt. % of the amorphous nickel hydroxide powder obtained in the above, 12 wt. % of a cobalt monoxide powder and 2 wt. % of a yttrium oxide powder were mixed to obtain a mixture. The resultant mixture was mixed with an aqueous solution containing 0.5 wt. % of carboxymethylcellulose as a binder to obtain a paste-like product. The paste-like product was impregnated in a 1.5 mm thick foamed nickel porous body of 400 g/m² having an average pore size of 100 μm and a porosity of 95% as a cathode collector, followed by drying at 80° C. for one hour. The resultant was subjected to press-forming by means of a roll pressing machine to obtain an electrode structural body having a thickness of 0.75 mm. The electrode structural body was cut to have a prescribed size. And a lead comprising a nickel foil tub was connected to the resultant by way of spot-welding. Thus, there was obtained a cathode 501.

COMPARATIVE EXAMPLE 1

The procedures of Example 1 were repeated, except that a nickel hydroxide powder was prepared in the same manner as in the step 1-(1) as will be described below and the cathode was prepared using the nickel hydroxide powder as it is as a cathode electrode material without conducting the step 1-(2) as will be described below, to obtain a spiral-wound cylindrical type rechargeable battery.

Preparation of Nickel Hydroxide Powder:

An aqueous solution of nickel sulfate with a prescribed content was added with ammonium sulfate. An aqueous solution of sodium hydroxide was dropwise added to the nickel sulfate aqueous solution while controlling the pH value thereof to a pH value of 11 under condition of vigorously stirring the nickel sulfate aqueous solution to obtain a precipitate. The resultant precipitate was washed with pure water and dried to obtain a nickel hydroxide powder.

Using the X-ray diffraction device RINT 2000, a sample of the resultant nickel hydroxide powder was subjected to wide angle X-ray diffraction analysis using K α-rays of Cu as a radiation source, which afforded an X-ray diffraction chart shown in FIG. 3 which has a diffraction peak of a (001) face appeared near a diffraction angle 2θ=19° having a narrow half-value width of 0.63% and a diffraction peak of a (101) face appeared near a diffraction angle 2θ=38° having a narrow half-value width of 1.01°. The presence of these peaks having a narrow half-value width indicates that the nickel hydroxide powder does not have amorphous phase. Calculation was carried out on the basis of the half-value widths and the diffraction angles of these peaks and in accordance with the foregoing Scherrer's equation. As a result, there were obtained a crystallite size of 13.9 nm and another crystallite size of 10.6 nm. Separately, an average particle size of the resultant nickel hydroxide powder was measured in the same manner as in Example 1. As a result, the nickel hydroxide powder was found to have an average particle size of 10.3 μm. Further, an apparent density (a tap density) of the resultant nickel hydroxide power was measured in the same manner as in Example 1. As a result, the resultant nickel hydroxide powder was found to have an apparent density (a tap density) of 2.12 g/cc. In addition, a specific surface area of the resultant nickel hydroxide powder was measured in the same manner as in Example 1. As a result, the resultant nickel hydroxide powder was found to have a specific surface area of 15.3 m²/g.

The results obtained are collectively shown in Table 1.

Preparation of Cathode 501:

86 wt. % of the nickel hydroxide powder obtained in the above, 12 wt. % of a cobalt monoxide powder and 2 wt. % of a yttrium oxide powder were mixed to obtain a mixture. The resultant mixture was mixed with an aqueous solution containing 0.5 wt. % of carboxymethylcellulose as a binder to obtain a paste-like product. The paste-like product was impregnated in a 1.5 mm thick foamed nickel porous body of 400 g/m² having an average pore size of 100 μm and a porosity of 95% as a cathode collector, followed by drying at 80° C. for one hour. The resultant was subjected to press-forming by means of a roll pressing machine to obtain an electrode structural body having a thickness of 0.75 mm. The electrode structural body was cut to have a prescribed size. And a lead comprising a nickel foil tub was connected to the resultant by way of spot-welding. Thus, there was obtained a cathode 501.

Evaluation

1. For the cathode of each of the rechargeable batteries obtained in Examples 1 and 2 and Comparative Example 1, a packing density of the active material (the cathode electrode material) was measured by a manner of dividing a weight value of the active material (=a value obtained by subtracting the collector weight from the weight of the entire of the cathode) by a volume of the cathode.

The resultant packing density values are collectively shown in Table 1 in indexes when the packing density value of Comparative Example 1 is set at 100.

2. On the basis of the results shown in Table 1 and FIG. 3, the following facts are understood. The cathode active material (the nickel hydroxide powder) of Comparative Example 1 has relatively narrow peaks having a small half-value width in the X-ray diffraction chart and relatively large crystallite sizes. In comparison with this, any of the cathode active materials (the nickel hydroxide powders) in Examples 1 and 2 has broader peaks having a larger half-value width in the X-ray diffraction chart and smaller crystallite sizes. In this respect, it is understood that the nickel hydroxide powders in Examples 1 and 2 are amorphous. Separately, in Example 1, it is understood that by concurrently adding cobalt monoxide at the time of the grinding treatment, the starting nickel hydroxide powder is remarkably amorphized and thus, cobalt monoxide contributes in promoting the amorphization of the starting nickel hydroxide powder. Further, in Examples 1 and 2, it is understood that by the grinding treatment, the average particle size of the starting nickel hydroxide powder is diminished and along with this, the apparent density is also diminished. This situation is considered to be due to a reason that the nickel hydroxide powder after the grinding treatment comprises fine particles having an undefined form with an irregular surface, part of which being secondarily coagulated. Separately, it is understood that the specific surface area is increased by the grinding treatment, where although the average particle size is small by more than one digit in comparison with that in Comparative Example 1 but the change thereof is relatively small. This situation indicates that the internal micropore volume of the nickel hydroxide particulate (powder) after the grinding treatment is decreased. Here, in the case of using a cathode collector having a porous structure, it is preferred to impregnate a cathode active material in the cathode collector at an increased packing density in order to obtain a cathode having an improved capacity. For each of the cathodes obtained in Examples 1 and 2, it was considered that the packing density would be decreased in view of the apparent density. But the result of examination revealed that it is substantially the same as that in Comparative Example 1 where the nickel hydroxide particulate (powder) for which no grinding treatment was performed was used. The reason for this is considered such that the internal micropore volume of the nickel hydroxide particulate (powder) is decreased by the grinding treatment.

EXAMPLE 3

The procedures of Example 1 were repeated, except that the step 1-(2) and the step 1-(3) in Example 1 were conducted as will be described below, to obtain a spiral-wound cylindrical type rechargeable battery.
Preparation of Cathode Electrode Material:

92 wt. % of the nickel hydroxide powder obtained in the step 1-(1) of Example 1, 6 wt. % of a cobalt monoxide powder and 2 wt. % of a yttrium oxide powder were mixed to obtain a mixture. The resultant mixture and rigid grinding balls were together introduced into a planetary ball mill grinding apparatus, where the mixture was subjected to a grinding treatment in an argon atmosphere at an acceleration of 15 G for 10 minutes to obtain a powder. The resultant powder was subjected to an ultrasonic dispersion treatment in pure water, followed by drying, to obtain an amorphous nickel hydroxide powder (particulate) combined with cobalt monoxide and yttrium oxide.

Using the X-ray diffraction device RINT 2000, a sample of the resultant amorphous nickel hydroxide powder was subjected to wide angle X-ray diffraction analysis using K$\alpha$-rays of Cu as a radiation source, which afforded an X-ray diffraction chart which has a broad diffraction peak of a (001) face appeared near a diffraction angle $2\theta=19°$ having a half-value width of 1.34 and a broad diffraction peak of a (101) face appeared near a diffraction angle $2\theta 38°$ having a half-value width of 1.73°. The presence of these peaks having a wide half-value width indicates that the powder has amorphous phase. Separately, using the laser scattering particle size distribution analyzer LA-920, a sample of the resultant amorphous nickel hydroxide powder was subjected to analysis with respect to its particle size distribution by dispersing the sample in water through ultrasonic irradiation. As a result, the powder was found to have an average particle size of 1.01 $\mu$m.

The results obtained are collectively shown in Table 2.
Preparation of Cathode 501:

93.5 wt. % of the amorphous nickel hydroxide powder obtained in the above and 6.5 wt. % of a cobalt monoxide powder were mixed to obtain a mixture. The resultant mixture was mixed with an aqueous solution containing 0.5 wt. % of carboxymethylcellulose as a binder to obtain a paste-like product. The paste-like product was impregnated in a 1.5 mm thick foamed nickel porous body of 400 g/m$^2$ having an average pore size of 100 $\mu$m and a porosity of 95% as a cathode collector, followed by drying at 80° C. for one hour. The resultant was subjected to press-forming by means of a roll pressing machine to obtain an electrode structural body having a thickness of 0.75 mm. The electrode structural body was cut to have a prescribed size. And a lead comprising a nickel foil tub was connected to the resultant by way of spot-welding. Thus, there was obtained a cathode 501.

EXAMPLE 4

The procedures of Example 1 were repeated, except that the step 1-(2) and the step 1-(3) in Example 1 were conducted as will be described below, to obtain a spiral-wound cylindrical type rechargeable battery.
Preparation of Cathode Electrode Material:

88 wt. % of the nickel hydroxide powder obtained in the step 1-(1) of Example 1 and 12 wt. % of a cobalt monoxide powder were mixed to obtain a mixture. The resultant mixture and rigid grinding balls were together introduced into a planetary ball mill grinding apparatus, where the mixture was subjected to a grinding treatment in an argon atmosphere at an acceleration of 15 G for 10 minutes to obtain a powder. The resultant powder was subjected to an ultrasonic dispersion treatment in pure water, followed by drying, to obtain an amorphous nickel hydroxide powder (particulate) combined with cobalt monoxide.

Using the X-ray diffraction device RINT 2000, a sample of the resultant amorphous nickel hydroxide powder was subjected to wide angle X-ray diffraction analysis using K$\alpha$-rays of Cu as a radiation source, which afforded an X-ray diffraction chart which has a broad diffraction peak of a (001) face appeared near a diffraction angle $2\theta=19°$ having a half-value width of 1.440 and a broad diffraction peak of a (101) face appeared near a diffraction angle $2\theta=38°$ having a half-value width of 1.93°. The presence of these peaks having a wide half-value width indicates that the powder has amorphous phase. Separately, using the laser scattering particle size distribution analyzer LA-920, a sample of the resultant amorphous nickel hydroxide powder was subjected to analysis with respect to its particle size distribution by dispersing the sample in water through ultrasonic irradiation. As a result, the powder was found to have an average particle size of 1.04 $\mu$m.

The results obtained are collectively shown in Table 2.
Preparation of Cathode 501:

98 wt. % of the amorphous nickel hydroxide powder obtained in the above and 2 wt. % of a yttrium oxide powder were mixed to obtain a mixture. The resultant mixture was mixed with an aqueous solution containing 0.5 wt. % of carboxymethylcellulose as a binder to obtain a paste-like product. The paste-like product was impregnated in a 1.5 mm thick foamed nickel porous body of 400 g/m$^2$ having an average pore size of 100 $\mu$m and a porosity of 95% as a cathode collector, followed by drying at 80° C. for one hour.

The resultant was subjected to press-forming by means of a roll pressing machine to obtain an electrode structural body having a thickness of 0.75 mm.

The electrode structural body obtained was cut to have a prescribed size. And a lead comprising a nickel foil tub was connected to the resultant by way of spot-welding. Thus, there was obtained a cathode 501.

COMPARATIVE EXAMPLE 2

The procedures of Example 1 were repeated, except that the step 1-(2) and the step 1-(3) in Example 1 were conducted as will be described below, to obtain a spiral-wound cylindrical type rechargeable battery.

Preparation of Cathode Electrode Material:

86 wt. % of the nickel hydroxide powder obtained in the step 1-(1) of Example 1, 12 wt. % of a cobalt monoxide powder and 2 wt. % of a yttrium oxide powder were mixed to obtain a mixture. The resultant mixture and rigid grinding balls were together introduced into a bench type tumbling ball mill grinding apparatus, where the mixture was subjected to a grinding treatment in an argon atmosphere at a roll axis revolution speed of 300 rpm for 2 hours to obtain a powder. The resultant powder was subjected to an ultrasonic dispersion treatment in pure water, followed by drying, to obtain a nickel hydroxide powder (particulate) admixed with cobalt monoxide and yttrium oxide.

Using the X-ray diffraction device RINT 2000, a sample of the resultant nickel hydroxide powder was subjected to wide angle X-ray diffraction analysis using K α-rays of cu as a radiation source, which afforded an X-ray diffraction chart which has a diffraction peak of a (001) face appeared near a diffraction angle $2\theta=19°$ having a half-value width of $0.74°$ and a diffraction peak of a (101) face appeared near a diffraction angle $2\theta=38°$ having a half-value width of $1.09°$. Separately, using the laser scattering particle size distribution analyzer LA-920, a sample of the resultant nickel hydroxide powder was subjected to analysis with respect to its particle size distribution by dispersing the sample in water through ultrasonic irradiation. As a result, the powder was found to have an average particle size of 2.12 $\mu$m.

The results obtained are collectively shown in Table 2.

Preparation of Cathode 501:

The nickel hydroxide powder obtained in the above was mixed with an aqueous solution containing 0.5 wt. % of carboxymethylcellulose as a binder to obtain a paste-like product. The paste-like product was impregnated in a 1.5 mm thick foamed nickel porous body of 400 g/m² having an average pore size of 100 $\mu$m and a porosity of 95% as a cathode collector, followed by drying at 80° C. for one hour. The resultant was subjected to press-forming by means of a roll pressing machine to obtain an electrode structural body having a thickness of 0.75 mm. The electrode structural body obtained was cut to have a prescribed size. And a lead comprising a nickel foil tub was connected to the resultant by way of spot-welding. Thus, there was obtained a cathode 501.

COMPARATIVE EXAMPLE 3

The procedures of Comparative Example 1 were repeated, except that the step 1-(1) [preparation of nickel hydroxide powder] was conducted as will be described below, to obtain a spiral-wound cylindrical type rechargeable battery.

Preparation of Nickel Hydroxide Powder:

An aqueous solution obtained by dissolving a prescribed amount of nickel sulfate and a prescribed amount of zinc sulfate in pure water was added with ammonium sulfate. A sodium hydroxide aqueous solution was dropwise added to the aqueous solution while controlling the pH value thereof to a pH value of 11 under condition of vigorously stirring the aqueous solution to obtain a precipitate. The resultant precipitate was washed with pure water and dried to obtain a nickel hydroxide powder containing Zn in a solid solution state.

A sample of the resultant nickel hydroxide powder was subjected to analysis by means of inductive coupled plasma spectrometry. As a result, the content of the solute Zn in the nickel hydroxide powder was found to be 5 wt. % in terms of the value of a hydroxide thereof. Separately, using the X-ray diffraction device RINT 2000, a sample of the resultant nickel hydroxide powder was subjected to wide angle X-ray diffraction analysis using K α-rays of Cu as a radiation source, which afforded an X-ray diffraction chart which has a diffraction peak of a (001) face appeared near a diffraction angle $2\theta=19°$ having a half-value width of $0.68°$ and a diffraction peak of a (101) face appeared near a diffraction angle $2\theta=38°$ having a half-value width of $1.07°$. Further, an average particle size of the resultant nickel hydroxide powder was measured in the same manner as in Example 1. As a result, the nickel hydroxide powder was found to have an average particle size of 10.8 $\mu$m.

The results obtained are collectively shown in Table 2.

Evaluation of Battery Characteristics

For each of the rechargeable batteries obtained in Examples 1 to 4 and Comparative Examples 1 to 3, from the content of the nickel hydroxide in the cathode, there was obtained a theoretical capacity on an one electron reaction basis. And under temperature condition of 20° C., with respect to the theoretical capacity, a cycle in that 150% charging is performed at a constant current with a charge rate of 0.1 C., a pause for one hour is taken, discharging is performed at a constant current with a discharge rate of 0.2 C until a cutoff voltage of 0.9 V, and a pause for one hour is taken, was repeated three times. Successively, a cycle in that 250% charging is performed at a constant current with a charge rate of 1.0 C, a pause for one hour is taken, discharging is performed at a constant current with a discharge rate of 0.2 C until a cutoff voltage of 0.9 V, and a pause for one hour is taken, was repeated two times. Thereafter, the following charging-and-discharging cycle test was conducted. That is, under temperature condition of 20° C., with respect to the theoretical capacity, a cycle in that 150% charging is performed at a constant current with a charge rate of 0.1 C, a pause for one hour is taken, discharging is performed at a constant current with a discharge rate of 0.2 C until, cutoff voltage of 0.9 V, and a pause for one hour is taken, was repeated 200 times, where a discharge capacity in the first charging-and-discharging cycle as a initial discharge capacity was measured, and a discharge capacity in the 200th charging-and-discharging cycle as a last discharge capacity was measured.

The value of the initial discharge capacity was divided by the value of the previously acquired theoretical capacity to obtain an initial active-material utilization efficiency. Similarly, the value of the last discharge capacity was divided by the value of the previously acquired theoretical capacity to obtain an active-material utilization efficiency after the 200 charging-and-discharging cycles. In this way, for each of the rechargeable batteries obtained in Examples 1 to 4 and Comparative Examples 1 to 3, there were obtained an initial active-material utilization efficiency and an active-material utilization efficiency after the 200 charging-and-discharging cycles.

The results obtained are collectively shown in Table 2.

Based on the results shown in Table 2, the following facts are understood. That is, it is understood that any of the rechargeable batteries obtained in Examples 1 to 4 has a high initial active-material utilization efficiency. The reason for this is considered such that the charging efficiency is improved by the amorphization and the number of reactive electrons is increased. It is also understood that a reduction rate in the active-material utilization efficiency after the 200 charging-and-discharging cycles is relatively small and the reduction rate has a tendency to diminish in the case where the half-value widths are large. From these facts, it is understood that the effect of preventing γ-type nickel oxyhydroxide from being generated is improves as the amorphization proceeds. The reason why the initial active-material utilization efficiency of only the rechargeable battery of Example 4 is relatively small is considered such that the cobalt monoxide is partly oxidized into a tricobalt tetraoxide by the amorphization. For this situation, it is understood that the addition of yttrium oxide together with cobalt monoxide at the time of the grinding treatment provides an effect to prevent the cobalt monoxide from being oxidized as above described.

Figure 7:
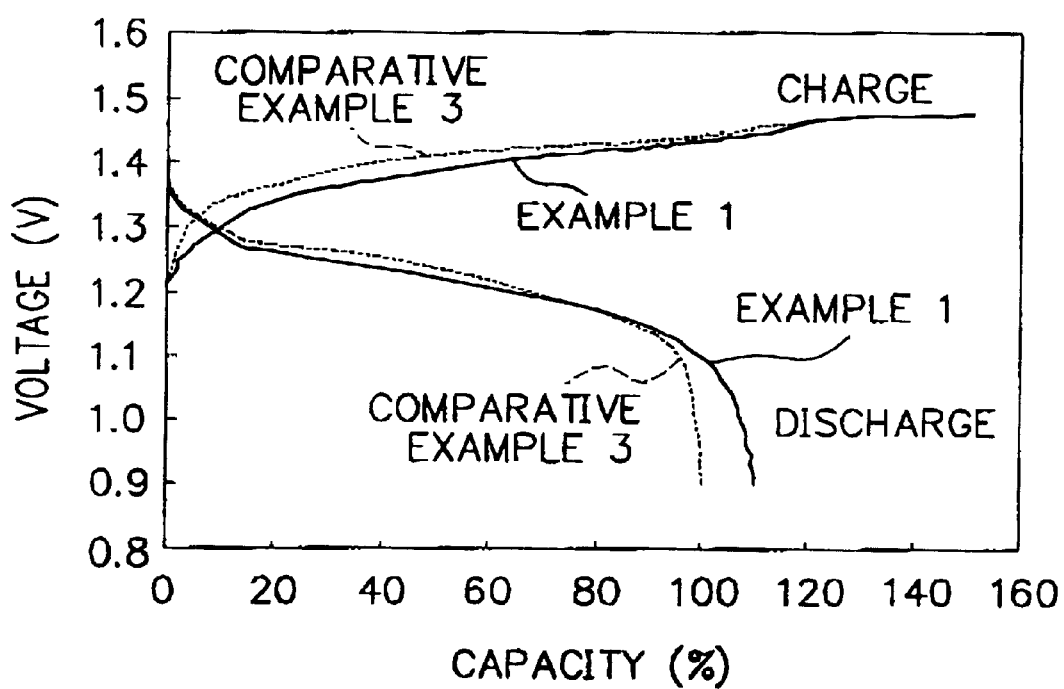
FIG. 7 collectively shows charging and discharging curves of a rechargeable battery obtained in Example 1 which will be described later and charging and discharging curves of a rechargeable battery obtained in Comparative Example 3 which will be described later.

Separately, it is understood that the initial active-material utilization efficiency of each of the rechargeable batteries obtained in Comparative Examples 1 and 2 is high but it is markedly lowered after the 200 charging-and-discharging cycles. The reason for this is considered such that the charging-and-discharging cycle with accompaniment of generation of γ-type nickel oxyhydroxide was repeated. From the evaluated results of the rechargeable battery of Comparative Example 2, it is understood that merely by conducting certain grinding treatment, there cannot be attained the effect of preventing γ-type nickel oxyhydroxide from being generated. For the rechargeable battery whose cathode comprising the nickel hydroxide powder containing Zn in a solid solution state obtained in Comparative Example 3, it is understood that the initial active-material utilization efficiency is small but the reduction rate after the 200 charging-and-discharging cycles is small. The charge and discharge curves at an initial stage in the repetition of the charging-and-discharging cycle of the rechargeable battery obtained in Example 1 and those of the rechargeable battery obtained in Comparative Example 3 are collectively shown in FIG. 7.

Figure 8:
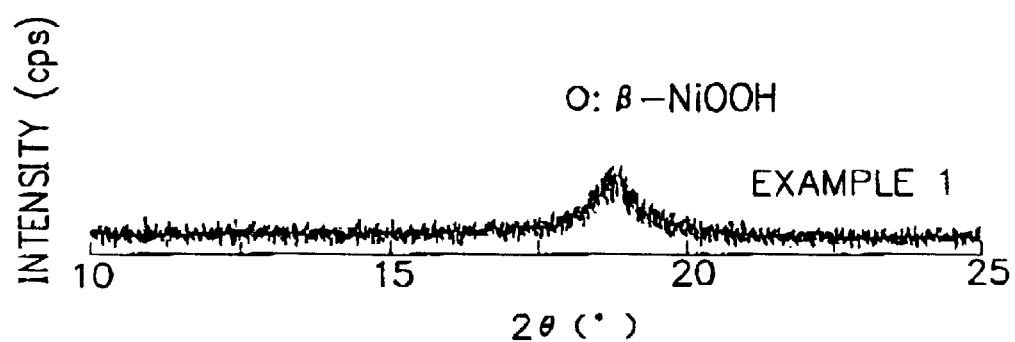
FIG. 8 shows an X-ray diffraction chart of an amorphous phase-bearing nickel hydroxide particulate (powder) used in a rechargeable battery of Example 1 (which will be described layer) in a full-charged state after 200 charging-and-discharging cycles.
Figure 9:
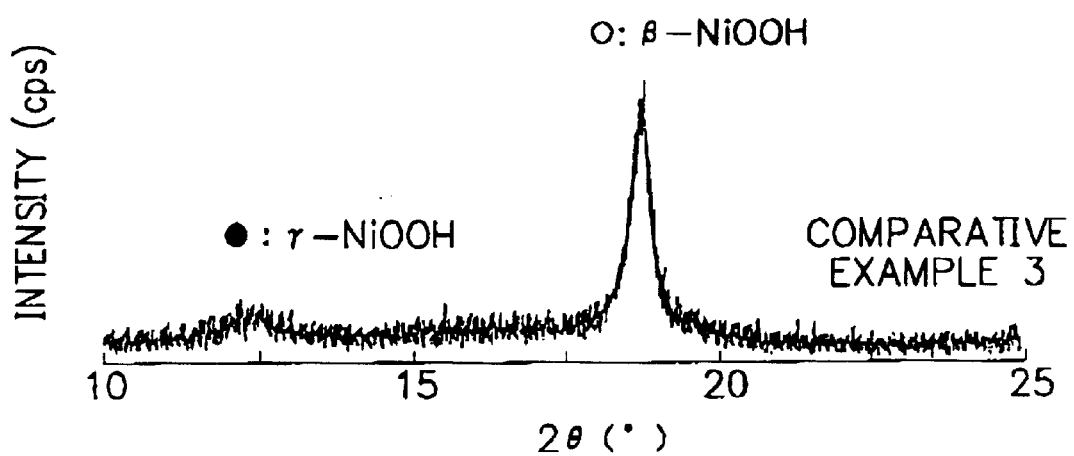
FIG. 9 shows an X-ray diffraction chart of a crystalline nickel hydroxide powder used in a rechargeable battery of Comparative Example 3 (which will be described layer) in a full-charged state after 200 charging-and-discharging cycles.

Each of the rechargeable batteries of Example 1 and Comparative Example 3 which are respectively in a full-charged state after the 200th charging-and-discharging cycle was decomposed and the cathode active material was taken out. A sample of the cathode active material taken out from the rechargeable battery of Example 1 was subjected to wide angle X-ray diffraction analysis using Kα-rays of Cu as a radiation source, which afforded an X-ray diffraction chart shown in FIG. 8. Similarly, a sample of the cathode active material taken out from the rechargeable battery of Comparative Example 3 was subjected to wide angle X-ray diffraction analysis using Kα-rays of Cu as a radiation source, which afforded an X-ray diffraction chart shown in FIG. 9. From these figures, it is understood that in the rechargeable battery of Comparative Example 3, γ-type nickel oxyhydroxide and β-type nickel oxyhydroxide are mingled but in the rechargeable battery of Example 1, only β-type nickel oxyhydroxide is present. Thus, it is understood that in the rechargeable battery of Example 1, the effect of preventing γ-type nickel oxyhydroxide from being generated is maintained over a long period of time. Besides, examination was conducted also for the cathode active material of each of the rechargeable batteries of Example 1 and Comparative Example 3 which are respectively in a completely discharged state. As a result, the cathode active material of each of the rechargeable batteries of Example 1 and Comparative Example 3 was found to comprise β-type nickel hydroxide.

From the above results, it is understood that according to the present invention, it is possible to effectively prevent the generation of γ-type nickel oxyhydroxide without adding zinc or cadmium in a solid solution state. This situation makes it possible to increase the relative amount of nickel hydroxide in the cathode active material, where the utilization efficiency of the nickel hydroxide itself is increased, resulting in an increase in the energy density of the cathode.

Further, it is also understood that in order to effectively prevent the generation of γ-type nickel oxyhydroxide, the amorphization is desired to conduct under condition where the half-value width of the (001) face and that of the (101) face become to be more than 1.2° and more than 1.5° respectively, and this can be achieved by conducting the grinding treatment under condition where the average particle size becomes to be less than 2 μm.

EXAMPLE 5

The procedures of Example 1 were repeated, except that the step 1-(2) [Preparation of cathode electrode material] was conducted as will be described below, to obtain a spiral-wound cylindrical type rechargeable battery.

Preparation of Cathode Electrode Material:

97.5 wt. % of the nickel hydroxide powder obtained in the step 1-(1) of Example 1 and 2.5 wt. % of a calcium hydroxide powder were mixed to obtain a mixture. The resultant mixture and rigid grinding balls were together introduced into a planetary ball mill grinding apparatus, where the mixture was subjected to a grinding treatment in an argon atmosphere at an acceleration of 5 G for one hour to obtain a powder. The resultant powder was subjected to an ultrasonic dispersion treatment in pure water, followed by drying, to obtain an amorphous nickel hydroxide powder (particulate) combined with calcium hydroxide. The powder obtained was dispersed in an aqueous solution containing a prescribed amount of cobalt sulfate dissolved therein, and a sodium hydroxide aqueous solution was dropwise added to the aqueous solution containing the powder dispersed therein while controlling the pH value of the aqueous solution to a pH value of 11 under condition of vigorously stirring the aqueous solution, followed by subjecting to reaction for one hour, whereby a calcium hydroxide-containing amorphous nickel hydroxide powder applied with surface treatment was obtained.

A sample of the resultant powder was subjected to elemental analysis with respect to its particle cross section by means of an X-ray microanalyser. As a result, each particle of the powder was found to have a cobalt layer formed thereon. Separately, a sample of the resultant powder was subjected to analysis by means of inductive coupled plasma spectrometry. As a result, the content of the cobalt in the powder was found to be 12 wt. % in terms of the value of a hydroxide thereof.

Now, the powder obtained in the above was immersed in an aqueous solution containing 30 wt. % of sodium hydroxide dissolved therein, followed by subjecting to a heat treatment in the presence of oxygen at 100° C. for 10 hours. The resultant was washed with pure water and dried to obtain a powder.

Using the X-ray diffraction device RINT 2000, a sample of the resultant powder was subjected to wide angle X-ray diffraction analysis using Kα-rays of Cu as a radiation source, which afforded an X-ray diffraction chart which has a broad diffraction peak of a (001) face appeared near a diffraction angle 2θ=19° having a half-value width of 1.26 and a broad diffraction peak of a (101) face appeared near a diffraction angle 2θ=38° having a half-value width of 1.62°. Separately, using the laser scattering particle size distribution analyzer LA-920, a sample of the resultant powder was subjected to analysis with respect to its particle size distribution by dispersing the sample in water through ultrasonic irradiation. As a result, the powder was found to have an average particle size of 1.15 μm.

The results obtained are collectively shown in Table 3.

EXAMPLE 6

The procedures of Example 1 were repeated, except that the step 1-(2) [Preparation of cathode electrode material] was conducted as will be described below, to obtain a spiral-wound cylindrical type rechargeable battery.
Preparation of Cathode Electrode Material:

The nickel hydroxide powder obtained in the step 1-(1) of Example 1 and rigid grinding balls were together introduced into a planetary ball mill grinding apparatus, where the nickel hydroxide powder was subjected to a grinding treatment in an argon atmosphere at an acceleration of 5 G for one hour to obtain a powder. The resultant powder was subjected to an ultrasonic dispersion treatment in pure water, followed by drying, to obtain an amorphous nickel hydroxide powder (particulate). The powder obtained was dispersed in an aqueous solution containing a prescribed amount of cobalt nitrate and a prescribed amount of calcium nitrate dissolved therein, and a sodium hydroxide aqueous solution was dropwise added to the aqueous solution containing the powder dispersed therein while controlling the pH value of the aqueous solution to a pH value of 11 under condition of vigorously stirring the aqueous solution, followed by subjecting to reaction for one hour, whereby an amorphous nickel hydroxide powder applied with surface treatment was obtained.

A sample of the resultant powder was subjected to elemental analysis with respect to its particle cross section by means of an X-ray microanalyser. As a result, each particle of the powder was found to have a cobalt layer partly containing calcium formed thereon. Separately, a sample of the resultant powder was subjected to analysis by means of inductive coupled plasma spectrometry. As a result, the content of the cobalt and that of the calcium in the powder were found to be 12 wt. % and 2 wt. % respectively in terms of the value of a hydroxide thereof.

Now, the powder obtained in the above was immersed in an aqueous solution containing 30 wt. % of sodium hydroxide dissolved therein, followed by subjecting to a heat treatment in the presence of oxygen at 100° C. for 10 hours. The resultant was washed with pure water and dried to obtain a powder.

Using the X-ray diffraction device RINT 2000, a sample of the resultant powder was subjected to wide angle X-ray diffraction analysis using Kα-rays of Cu as a radiation source, which afforded an X-ray diffraction chart which has a broad diffraction peak of a (001) face appeared near a diffraction angle 2θ=19° having a half-value width of 1.24° and a broad diffraction peak of a (101) face appeared near a diffraction angle 2θ=38° having a half-value width of 1.56°. Separately, using the laser scattering particle size distribution analyzer LA-920, a sample of the resultant powder was subjected to analysis, with respect to its particle size distribution by dispersing the sample in water through ultrasonic irradiation. As a result, the powder was found to have an average particle size of 1.09 μm.

The results obtained are collectively shown in Table 3.

EXAMPLE 7

The procedures of Example 1 were repeated, except that the step 1-(2) [Preparation of cathode electrode material] was conducted as will be described below, to obtain a spiral-wound cylindrical type rechargeable battery.
Preparation of Cathode Electrode Material:

97.5 wt. % of the nickel hydroxide powder obtained in the step 1-(1) of Example 1 and 2.5 wt. % of an aluminum hydroxide powder were mixed to obtain a mixture. The mixture and rigid grinding balls were together introduced into a planetary ball mill grinding apparatus, where the mixture was subjected to a grinding treatment in an argon atmosphere at an acceleration of 5 G for one hour to obtain a powder. The resultant powder was subjected to an ultrasonic dispersion treatment in pure water, followed by drying, to obtain an amorphous nickel hydroxide powder (particulate) combined with aluminum hydroxide. The powder obtained was dispersed in an aqueous solution containing a prescribed amount of cobalt nitrate dissolved therein, and followed by introducing into an evaporator, where the aqueous solution containing the powder dispersed therein was stirred until the moisture was completely removed by vacuum evaporation. The powder obtained was subjected to a heat treatment at 170° C. where the cobalt nitrate contained in the powder was thermally decomposed.

Here, in order to confirm a product obtained by the thermal decomposition, only cobalt nitrate was thermally decomposed under the same condition to obtain a thermally decomposed product. The thermally decomposed product was subjected to X-ray diffraction analysis. As a result, the thermally decomposed product was found to be a cobalt monoxide.

A sample of the powder obtained in the above was subjected to elemental analysis with respect to its particle cross section by means of an X-ray microanalyser. As a result, each particle of the powder was found to have a cobalt layer formed thereon. Separately, a sample of the powder was subjected to analysis by means of inductive coupled plasma spectrometry. As a result, the content of the cobalt in the powder was found to be 12 wt. % in terms of the value of a cobalt monoxide.

Now, the powder obtained in the above was immersed in an aqueous solution containing 30 wt. % of sodium hydroxide dissolved therein, followed by subjecting to a heat treatment in the presence of oxygen at 100° C. for 10 hours. The resultant was washed with pure water and dried to obtain a powder.

Using the X-ray diffraction device RINT 2000, a sample of the resultant powder was subjected to wide angle X-ray diffraction analysis using Kα-rays of Cu as a radiation source, which afforded an X-ray diffraction chart which has a broad diffraction peak of a (001) face appeared near a diffraction angle 2θ=19° having a half-value width of 1.27° and a broad diffraction peak of a (101) face appeared near a diffraction angle 2θ=38° having a half-value width of 1.65°. Separately, using the laser scattering particle size distribution analyzer LA-920, a sample of the resultant powder was subjected to analysis with respect to its particle size distribution by dispersing the sample in water through ultrasonic irradiation. As a result, the powder was found to have an average particle size of 1.12 μm.

The results obtained are collectively shown in Table 3.

EXAMPLE 8

The procedures of Example 1 were repeated, except that instead of the step 1-(1) and the step 1-(2), as a cathode electrode material, a nickel hydroxide powder was prepared as will be described below and using said nickel hydroxide powder as the cathode electrode material, the step 1-(3) was conducted as will be described below, to obtain a spiral-wound cylindrical type rechargeable battery.

Preparation of Nickel Hydroxide Powder:

70 wt. % of an aqueous solution containing a prescribed amount of nickel nitrate dissolved therein and 30 wt. % of polyoxyethylene cetyl ether as a nonionic surface active agent were mixed while vigorously stirring, followed by adding an aqueous solution containing potassium hydroxide in an amount of 5 times the amount of the nickel nitrate in terms of the mole ratio, and the resultant was vigorously stirred, whereby a nickel hydroxide precipitate was obtained. An operation of washing the nickel hydroxide precipitate with alcohol and performing decantation was repeated several times, the nickel hydroxide precipitate was washed with pure water and dried to obtain a nickel hydroxide power.

Using the X-ray diffraction device RINT 2000, a sample of the resultant powder was subjected to wide angle X-ray diffraction analysis using K$\alpha$-rays of Cu as a radiation source, which afforded an X-ray diffraction chart shown in FIG. 10 which has an extremely broad diffraction peak pattern of a (001) and an extremely broad diffraction peak pattern of a (101) face. Therefore, it was impossible to obtain an accurate half-value width of the (001) face and that of the (101) face. Separately, using the laser scattering particle size distribution analyzer LA-920, a sample of the resultant powder was subjected to analysis with respect to its particle size distribution by dispersing the sample in water through ultrasonic irradiation. As a result, the powder was found to have an average particle size of 8.29 $\mu$m.

The results obtained are collectively shown in Table 3.

Preparation of Cathode 501:

86 wt. % of the nickel hydroxide powder obtained in the above, 12 wt. % of a cobalt monoxide powder and 2 wt. % of a yttrium oxide powder were mixed to obtain a mixture. The resultant mixture was mixed with an aqueous solution containing 0.5 wt. % of carboxymethylcellulose as a binder to obtain a paste-like product. The paste-like product was impregnated in a 1.5 mm thick foamed nickel porous body of 400 g/m$^2$ having an average pore size of 100 $\mu$m and a porosity of 95% as a cathode collector, followed by drying at 80° C. for one hour. The resultant was subjected to press-forming by means of a roll pressing machine to obtain an electrode structural body having a thickness of 0.75 mm. The electrode structural body was cut to have a prescribed size. And a lead comprising a nickel foil tub was connected to the resultant by way of spot-welding. Thus, there was obtained a cathode 501.

Evaluation of Battery Characteristics

Each of the rechargeable batteries obtained in Examples 5 to 8 was evaluated with respect to its initial active-material utilization efficiency and a subsequent active-material utilization efficiency after 200 charging-and-discharging cycles in the same manner described in the foregoing "Evaluation of Battery Characteristics".

The evaluated results obtained are collectively shown in Table 3.

Based on the results shown in Table 3, it is understood that any of the rechargeable batteries obtained in Examples 5 to 8 exhibits a high active-material utilization efficiency at an initial stage in the repetition of the charging-and-discharging cycle and that a reduction rate in the active-material utilization efficiency after the 200 charging-and-discharging cycles is slight. This situation indicates that the cathode electrode material (the cathode active material) used in each of these rechargeable batteries has the effect of preventing $\gamma$-type nickel oxyhydroxide from being generated.

EXAMPLE 9

The procedures of Example 1 were repeated, except that the step 1-(3) was conducted as will be described below, to obtain a spiral-wound cylindrical type rechargeable battery.

Preparation of Cathode 501:

90 wt. % of the amorphous nickel hydroxide powder obtained in the step 1-(2) in Example 1 and 10 wt. % of a crystalline nickel hydroxide powder which in X-ray diffraction using K$\alpha$-rays of Cu as a radiation source, has a diffraction peak of a (001) face appeared near a diffraction angle 2$\theta$=19° having a half-value width of 0.65° and has a diffraction peak of a (101) face appeared near a diffraction angle 2$\theta$=38° having a half-value width of less than 1.04° and which comprises particles having a spherical form and an average particle size of 10 $\mu$m and having a surface covered by a cobalt hydroxide layer to obtain a mixture. The mixture was mixed with 10 wt. % of a flake-like nickel powder as an electrically conductive auxiliary, followed by being mixed with an aqueous solution containing 0.5 wt. % of carboxymethylcellulose as a binder to obtain a paste-like product. The paste-like product was applied onto each of opposite surfaces of a 100 $\mu$m thick nickel-plated punching metal of 360 g/m$^2$ as a cathode collector, followed by drying at 80° C. for one hour. The resultant was subjected to press-forming by means of a roll pressing machine to obtain an electrode structural body having a thickness of 0.6 mm. The electrode structural body was cut to have a prescribed size. And a lead comprising a nickel foil tub was connected to the resultant by way of spot-welding. Thus, there was obtained a cathode 501.

EXAMPLE 10

The procedures of Example 9 were repeated, except that in the preparation of the cathode, the amount of the amorphous nickel hydroxide powder was made to be 70 wt. % and the amount of the crystalline nickel oxide powder was made to be 30 wt. %, to obtain a spiral-wound cylindrical type rechargeable battery.

EXAMPLE 11

The procedures of Example 9 were repeated, except that in the preparation of the cathode, the amount of the amorphous nickel hydroxide powder was made to be 50 wt. % and the amount of the crystalline nickel oxide powder was made to be 50 wt. %, to obtain a spiral-wound cylindrical type rechargeable battery.

EXAMPLE 12

The procedures of Example 9 were repeated, except that in the preparation of the cathode, the amount of the amorphous nickel hydroxide powder was made to be 30 wt. % and the amount of the crystalline nickel oxide powder was made to be 70 wt. %, to obtain a spiral-wound cylindrical type rechargeable battery.

EXAMPLE 13

The procedures of Example 9 were repeated, except that in the preparation of the cathode, the amount of the amorphous nickel hydroxide powder was made to be 10 wt. % and the amount of the crystalline nickel oxide powder was made to be 90 wt. %, to obtain a spiral-wound cylindrical type rechargeable battery.

COMPARATIVE EXAMPLE 4

The procedures of Example 9 were repeated, except that in the preparation of the cathode, only the crystalline nickel oxide powder was used, to obtain a spiral-wound cylindrical type rechargeable battery.

Evaluation of Battery Characteristics

1. Each of the rechargeable batteries obtained in Examples 9 to 13 and Comparative Example 4 was evaluated with respect to its packing density in the same manner described in the foregoing "Evaluation" of Examples 1 and 2 and Comparative Example 1.

The evaluated packing densities obtained are collectively shown in Table 4 in indexes when the packing density of Comparative Example 4 is set at 100.

2. Each of the rechargeable batteries obtained in Examples 9 to 13 and Comparative Example 4 was evaluated with respect to its initial active-material utilization efficiency in the same manner described in the foregoing "Evaluation of Battery Characteristics".

The evaluated initial active-material utilization efficiencies obtained are collectively shown in Table 4 in indexes when the initial active-material utilization efficiency of Comparative Example 4 is set at 100.

3. Each of the rechargeable batteries obtained in Examples 9 to 13 and Comparative Example 4 was evaluated with respect to its capacity density. The capacity density was evaluated in terms of a capacity per unit volume of the cathode based on the initial cathode capacity.

The evaluated capacity densities obtained are collectively shown in Table 4 in indexes when the capacity density of Comparative Example 4 is set at 100.

As Table 4 illustrates, it is understood that the packing density of the cathode electrode material (the cathode active material) becomes highest when the mixing ratio of the amorphous nickel hydroxide powder and the crystalline nickel hydroxide powder is in a range of from 50:50 to 30:70. And it is understood that the active-material utilization efficiency is decreased as the mixing ratio of the crystalline nickel hydroxide powder is increased. It is also understood that the capacity density becomes desirably high when the mixing ratio of the amorphous nickel hydroxide powder is made to be in a range of 10 to 70 wt. %.

TABLE 1

|  | Example 1 | Example 2 | Comparative Example 1 |
|---|---|---|---|
| half-value width (°) |  |  |  |
| (001) face | 1.43 | 1.22 | 0.63 |
| (101) face | 1.99 | 1.54 | 1.01 |
| crystallite size (nm) |  |  |  |
| (001) face | 6.1 | 7.5 | 13.9 |
| (101) face | 5.3 | 6.6 | 10.6 |
| average particle size (μm) | 0.99 | 1.07 | 10.3 |
| apparent density (g/cc) | 1.87 | 1.81 | 2.12 |
| specific surface area (m²/g) | 21.6 | 19.4 | 15.3 |
| packing density (%) | 99 | 98 | 100 |

TABLE 2

|  | half-value width (°) | | average particle size (μm) | initial active-material utilization efficiency (%) | active-material utilization efficiency after 200 charging-and-discharging cycles (%) |
|---|---|---|---|---|---|
|  | (001) face | (101) face | | | |
| Example 1 | 1.43 | 1.99 | 0.99 | 110 | 109 |
| Example 2 | 1.22 | 1.54 | 1.07 | 108 | 101 |
| Example 3 | 1.34 | 1.73 | 1.01 | 111 | 108 |
| Example 4 | 1.44 | 1.93 | 1.04 | 103 | 104 |
| Comparative Example 1 | 0.63 | 1.01 | 10.3 | 108 | 68 |
| Comparative Example 2 | 0.74 | 1.09 | 2.12 | 106 | 82 |
| Comparative Example 3 | 0.68 | 1.07 | 10.8 | 99 | 92 |

TABLE 3

|  | half-value width (°) | | average particle size (μm) | initial active-material utilization efficiency (%) | active-material utilization efficiency after 200 charging-and-discharging cycles (%) |
|---|---|---|---|---|---|
|  | (001) face | (101) face | | | |
| Example 5 | 1.26 | 1.62 | 1.15 | 110 | 105 |
| Example 6 | 1.24 | 1.56 | 1.09 | 109 | 103 |
| Example 7 | 1.27 | 1.65 | 1.12 | 111 | 106 |
| Example 8 | — | — | 8.29 | 106 | 100 |

TABLE 4

|  | amorphous powder (wt. %) | crystalline powder (wt. %) | packing density (%) | active-material utilization efficiency (%) | capacity density (%) |
|---|---|---|---|---|---|
| Example 1 | 100 | 0 | 99 | 110 | 109 |
| Example 9 | 90 | 10 | 104 | 109 | 113 |
| Example 10 | 70 | 30 | 106 | 107 | 113 |
| Example 11 | 50 | 50 | 108 | 105 | 113 |
| Example 12 | 30 | 70 | 108 | 103 | 111 |
| Example 13 | 10 | 90 | 103 | 101 | 104 |
| Comparative Example 4 | 0 | 100 | 100 | 100 | 100 |

What is claimed is:

1. A rechargeable battery comprising at least a cathode, an anode, a separator, and an electrolyte comprising an alkali electrolyte solution, said cathode comprising an active material and a collector, characterized in that said active material of said cathode comprises a material containing an amorphous phase-bearing nickel hydroxide particulate which in X-ray diffraction using Kα-rays of Cu as a radiation source, has a diffraction peak of a (001) face appeared near a diffraction angle 2θ=19° having a half-value width of more than 1.2° and has a diffraction peak of a (101) face appeared near a diffraction angle 2θ=38° having a half-value width of more than 1.5°.

2. The rechargeable battery according to claim 1, wherein said amorphous phase-bearing nickel hydroxide particulate has a crystallite size in a direction perpendicular to the (001) face and a crystallite size in a direction perpendicular to the (101) face, each of said crystallite sizes being calculated from a result of the X-ray diffraction and being less than 8 nm.

3. The rechargeable battery according to claim 1, wherein said amorphous phase-bearing nickel hydroxide particulate comprises particles in an undefined form having an irregular surface, having an average particle size in a range of 0.2 to 2 μm.

4. The rechargeable battery according to claim 1, wherein said amorphous phase-bearing nickel hydroxide particulate contains Zn or/and Cd respectively as a minor component.

5. The rechargeable battery according to claim 4, wherein the amorphous phase-bearing nickel hydroxide particulate contains Zn or/and Cd in an amount of 0.2 wt. % or less in terms of a hydroxide thereof.

6. The rechargeable battery according to claim 1, wherein said active material comprises said amorphous phase-bearing nickel hydroxide particulate and an electrically conductive material.

7. The rechargeable battery according to claim 6, wherein said electrically conductive material is a metallic cobalt material, a cobalt compound, or a mixture thereof.

8. The rechargeable battery according to claim 6, wherein the active material contains said electrically conductive material in an amount of from 5 to 20 wt. % versus a total amount of the components of the active material.

9. The rechargeable battery according to claim 7, wherein said metallic cobalt material and said cobalt compound as the electrically conductive material contain amorphous phase.

10. The rechargeable battery according to any of claims 6 to 9, wherein the amorphous phase-bearing nickel hydroxide particulate comprises particles having a surfaces which is partially or entirely covered by said electrically conductive material or the amorphous phase-bearing nickel hydroxide particulate is combined with said electrically conductive material.

11. The rechargeable battery according to claim 7, wherein said cobalt compound comprises at least one kind of a cobalt compound selected from the group consisting of cobalt monoxide, cobalt hydroxide, and cobalt oxides whose crystal containing an alkali metal element.

12. The rechargeable battery according to claim 11, wherein said alkali metal element comprises at least one kind of a metal element selected from the group consisting of K, Na, and Li.

13. The rechargeable battery according to any of claims 6 to 8, wherein the active material further comprises an additive in addition to the amorphous phase-bearing nickel hydroxide particulate and the electrically conductive material, said additive comprising at least one kind of a metal compound selected from the group consisting of alkaline earth metal compounds, rare earth metal compounds, transition metal compounds of transition metal elements belonging to groups 4B, 5B, 6B, and 7B of the periodic table, and metal compounds of metal elements belonging to group 3A of the periodic table.

14. The rechargeable battery according to claim 13, wherein the active material contains said additive in an amount of from 1 to 5 wt. % versus a total amount of the components of the active material.

15. The rechargeable battery according to claim 13, wherein said additive contains amorphous phase.

16. The rechargeable battery according to claim 13, wherein the amorphous phase-bearing nickel hydroxide particulate is partially or entirely covered by said additive or the amorphous phase-bearing nickel hydroxide particulate is combined with said additive.

17. The rechargeable battery according to claim 13, wherein said alkaline earth metal compound comprises at least one kind of a compound selected from the group consisting of oxides and hydroxides of calcium, oxides and hydroxides of magnesium, oxides and hydroxides of strontium, and oxides and hydroxides of barium.

18. The rechargeable battery according to claim 13, wherein said rare earth metal compound comprises at least one kind of a compound selected from the group consisting of oxides and hydroxides of yttrium, oxides and hydroxides of holmium, oxides and hydroxides of erbium, oxides and hydroxides of thulium, oxides and hydroxides of ytterbium, and oxides and hydroxides of lutetium.

19. The rechargeable battery according to claim 13, wherein said transition metal compound comprises at least one kind of a compound selected from the group consisting of oxides and hydroxides of titanium, oxides and hydroxides of vanadium, oxides and hydroxides of chromium, and oxides and hydroxides of manganese.

20. The rechargeable battery according to claim 13, wherein said group 3A compound comprises at least one kind of a compound selected from the group consisting of oxides and hydroxides of aluminum, oxides and hydroxides of gallium, and oxides and hydroxides of indium.

21. The rechargeable battery according to claim 13, wherein said additive comprises at least one kind of a compound selected from the group consisting of oxides and hydroxides of yttrium, oxides and hydroxides of ytterbium, oxides and hydroxides of calcium, and oxides and hydroxides of aluminum.

22. The rechargeable battery according to claim 1, wherein said active material comprises said material containing said amorphous phase-bearing nickel hydroxide, particulate and a material containing a crystalline nickel hydroxide particulate which in X-ray diffraction using Kα-rays of Cu as a radiation source, has a diffraction peak of a (001) face appeared near a diffraction angle $2\theta=19°$ having a half-value width of less than $0.8°$ and has a diffraction peak of a (101) face appeared near a diffraction angle $2\theta=38°$ having a half-value width of less than $1.1°$.

23. The rechargeable battery according to claim 22, wherein said crystalline nickel hydroxide particulate comprises particles in a substantially spherical form having an average particle size in a range of 5 to 30 μm which is 5 times or more that of the amorphous phase-bearing nickel hydroxide particulate.

24. The rechargeable battery according to claim 22, wherein the active material contains said crystalline nickel hydroxide particulate in an amount of from 10 to 70 wt. % versus a total amount of the components of the active material.

25. The rechargeable battery according to claim 22, wherein said crystalline nickel hydroxide particulate contains at least one kind of an element selected from the group consisting of Zn, Mg and Ba in a solid solution state.

26. The rechargeable battery according to claim 1, wherein the collector of the cathode comprises a foamed metal porous body comprising a nickel material or a nickel-plated metallic material or an unwoven fabric member comprising a metal fiber.

27. The rechargeable battery according to claim 26, wherein said foamed metal porous body or said unwoven fabric member as the collector is impregnated with the active material of the cathode.

28. The rechargeable battery according to claim 1, wherein the collector of the cathode comprises a member selected from a punching metal member, an expanded metal member, and a metal foil member, respectively comprising a nickel material or a nickel-plated metallic material.

29. The rechargeable battery according to claim 28, wherein said member as the collector has the active material of the cathode as an active material layer arranged thereon.

30. The rechargeable battery according to claim 29, wherein said active material layer contains an electrically conductive auxiliary comprising at least one kind of a powdery material selected from the group consisting of a nickel powder, a copper powder, and a carbon powder, respectively in a spherical form, a flake form, a filament form, a spike form, a needle form, or a form comprising a combination of these forms.

31. The rechargeable battery according to claim 1, wherein the alkali electrolyte solution comprises an aqueous solution containing at least potassium hydroxide.

32. The rechargeable battery according to claim 31, wherein said aqueous solution contains said potassium hydroxide at a concentration in a range of from 8 to 12 mol/l.

33. The rechargeable battery according to claim 31, wherein said aqueous solution contains at least either lithium hydroxide or sodium hydroxide in addition to said potassium hydroxide.

34. A process for producing a rechargeable battery comprising at least a cathode, an anode, a separator, and an electrolyte comprising an alkali electrolyte solution, said cathode comprising an active material layer and a collector, said process including a step of forming said active material layer of said cathode by using (a) an amorphous phase-bearing nickel hydroxide particulate which in X-ray diffraction using Kα-rays of Cu as a radiation source, has a diffraction peak of a (001) face appeared near a diffraction angle $2\theta=19°$ having a half-value width of more than $1.2°$ and has a diffraction peak of a (101) face appeared near a diffraction angle $2\theta=38°$ having a half-value width of more than $1.5°$, (b) an electrically conductive material comprising a metallic cobalt or/and a cobalt compound, and (c) an additive comprising at least one kind of a metal compound selected from the group consisting of alkaline earth metal compounds, rare earth metal compounds, transition metal compounds of transition metal elements belonging to groups 4B, 5B, 6B, and 7B of the periodic table, and metal compounds of metal elements belonging to group 3A of the periodic table.

35. The process according to claim 34, which further includes a step of preparing said amorphous phase-bearing nickel hydroxide particulate (a) by subjecting a nickel hydroxide powder to a mechanical grinding treatment.

36. The process according to claim 35, wherein the mechanical grinding treatment is conducted by using a grinding apparatus comprising a planetary ball mill, a tumbling ball mill, or a vibration ball mill.

37. The process according to claim 34, which further includes a step of preparing said amorphous phase-bearing nickel hydroxide particulate (a) by a method wherein a solution containing a nickel compound dissolved therein is mixed with a chelating agent or a surface-active agent with a concentration which is greater than a critical micelle concentration and the mixture is reacted with an alkali.

38. The process according to claim 37, wherein as the nickel compound, at least one kind of a compound selected from the group consisting of nickel nitrate, nickel chloride, nickel carboxylate and nickel alkoxide is used.

39. The process according to claim 37, wherein as the chelating agent, citric acid, tartaric acid, maleic acid, or acetylacetone is used.

40. The process according to claim 34, which further includes a step wherein the amorphous phase-bearing nickel hydroxide particulate (a) is made to comprise particles having a surface which is partially or entirely covered by the electrically conductive material (b) or/and the additive (c) or the amorphous phase-bearing nickel hydroxide particulate (a) is combined with the electrically conductive material (b) or/and the additive (c).

41. The process according to claim 34, which further includes a step wherein a nickel hydroxide particulate prior to amorphization and the electrically conductive material (b) or/and the additive (c) are mechanically mixed, whereby obtaining an amorphous phase-bearing nickel hydroxide particulate as the amorphous phase-bearing nickel hydroxide particulate (a) in a state that said amorphous phase-bearing nickel hydroxide particulate comprises particles having a surface which is partially or entirely covered by the electrically conductive material (b) or/and the additive (c) or in a state that said amorphous phase-bearing nickel hydroxide particulate is combined with the electrically conductive material (b) or/and the additive (c).

42. The process according to claim 41, wherein the mechanical mixing is conducted by using a grinding apparatus comprising a planetary ball mill, a tumbling ball mill, or a vibration ball mill.

43. The process according to claim 34, which further includes a step wherein the amorphous-phase bearing nickel hydroxide particulate (a) is dispersed in a treating solution containing at least a cobalt salt, followed by being reacted with at least one kind of a compound selected from the group consisting of potassium hydroxide, sodium hydroxide, and lithium hydroxide, whereby the amorphous-phase bearing nickel hydroxide particulate (a) is made to comprise particles having a surface which is partially or entirely covered by a cobalt compound.

44. The process according to claim 43, which further includes a step wherein the amorphous-phase bearing nickel hydroxide particulate (a) covered by the cobalt compound is immersed in a solution containing at least one kind of a compound selected from the group consisting of potassium hydroxide, sodium hydroxide, and lithium hydroxide dissolved therein, followed by subjecting to a heat treatment in the presence of oxygen.

45. The process according to claim 43, wherein as the cobalt salt, cobalt sulfate, cobalt nitrate, or cobalt chloride is used.

46. The process according to claim 43, wherein the cobalt salt-containing treating solution additionally contains at least one kind of a metal compound selected from the group consisting of alkaline earth metal compounds, rare earth metal compounds, transition metal compounds of transition metal elements belonging to groups 4B, 5B, 6B, and 7B of the periodic table, and metal compounds of metal elements belonging to group 3A of the periodic table.

47. The process according to claim 34, which further includes a step wherein the amorphous phase-bearing nickel hydroxide particulate (a) is mixed with a cobalt salt capable of being decomposed at a temperature which is lower than the decomposition temperature of the nickel hydroxide and the mixture is heated until a temperature where the cobalt salt is decomposed, whereby the amorphous phase-bearing nickel hydroxide particulate is made to comprise particles having a surface which is partially or entirely covered by a cobalt compound.

48. The process according to claim 47, which further includes a step wherein the amorphous phase-bearing nickel hydroxide particulate (a) covered by the cobalt compound is immersed in a solution containing at least one kind of a compound selected from the group consisting of potassium hydroxide, sodium hydroxide, and lithium hydroxide dissolved therein, followed by subjecting to a heat treatment in the presence of oxygen.

49. The process according to claim 47, wherein the cobalt salt is cobalt nitrate.

50. The process according to claim 34, wherein in addition to the amorphous phase-bearing nickel hydroxide particulate (a), the electrically conductive material (b) or/and the additive (c), there is used a crystalline nickel hydroxide particulate (d) which in X-ray diffraction using Kα-rays of Cu as a radiation source, has a diffraction peak of a (001) face appeared near a diffraction angle 2θ=19° having a half-value width of less than 0.8° and has a diffraction peak of a (101) face appeared near a diffraction angle 2θ=38° having a half-value width of less than 1.1°.

51. The process according to claim 50, wherein the crystalline nickel hydroxide particulate (d) comprises particles having a substantially spherical form and which has an average particle size which is 5 times or more that of the amorphous phase-bearing nickel hydroxide particulate (a).

52. The process according to claim 50, which further includes a step wherein the crystalline nickel hydroxide particulate (d) is made to comprise particles having a surface which is partially or entirely covered by the electrically conductive material (b) or/and the additive (c).

53. The process according to claim 50, wherein the crystalline nickel hydroxide particulate (d) is used in an amount of from 10 to 70 wt. % versus a total amount of the components of the active material layer to be formed.

54. The process according to claim 50, wherein the crystalline nickel hydroxide particulate (d) contains at least one kind of an element selected from the group consisting of Zn, Mg and Ba in a solid solution state.

55. The process according to claim 34, wherein the cobalt compound used as the electrically conductive material (b) is at least one kind of a cobalt compound selected from the group consisting of cobalt monoxide, cobalt hydroxide, and cobalt oxides whose crystal containing an alkali metal element.

56. The process according to claim 34, wherein the alkaline earth metal compound used as the additive (c) is at least one kind of a compound selected from the group consisting of oxides and hydroxides of calcium, oxides and hydroxides of magnesium, oxides and hydroxides of strontium, and oxides and hydroxides of barium.

57. The process according to claim 34, wherein the rare earth metal compound used as the additive is at least one kind of a compound selected from the group consisting of oxides and hydroxides of yttrium, oxides and hydroxides of holmium, oxides and hydroxides of erbium, oxides and hydroxides of thulium, oxides and hydroxides of ytterbium, and oxides and hydroxides of lutetium.

58. The process according to claim 34, wherein the transition metal compound used as the additive (c) is at least one kind of a compound selected from the group consisting of oxides and hydroxides of titanium, oxides and hydroxides of vanadium, oxides and hydroxides of chromium, and oxides and hydroxides of manganese.

59. The process according to claim 34, wherein the group 3A compound used as the additive (c) is at least one kind of a compound selected from the group consisting of oxides and hydroxides of aluminum, oxides and hydroxides of gallium, and oxides and hydroxides of indium.

60. The process according to claim 34, wherein as the additive (c), at least one kind of a compound selected from the group consisting of oxides and hydroxides of yttrium, oxides and hydroxides of ytterbium, oxides and hydroxides of calcium, and oxides and hydroxides of aluminum is used.

61. The process according to claim 34 or 48, wherein the step of forming the active material of the cathode is conducted by mixing the amorphous phase-bearing nickel hydroxide particulate (a) or the amorphous phase-bearing nickel hydroxide particulate (a) and the crystalline nickel hydroxide particulate (d), the electrically conductive material (b), and the additive (c) to obtain a mixture, mixing said mixture with a binder-containing solution to obtain a paste, and impregnating said paste in a foamed metal porous body comprising a nickel material or a nickel-plated metallic material or an unwoven fabric member comprising a metal fiber as the collector.

62. The according to claim 34 or 48, wherein the step of forming the active material of the cathode is conducted by mixing the amorphous phase-bearing nickel hydroxide particulate (a) or the amorphous phase-bearing nickel hydroxide particulate (a) and the crystalline nickel hydroxide particulate (d), the electrically conductive material (b), and the additive (c) to obtain a mixture, mixing said mixture with a binder-containing solution to obtain a paste, and fixing said paste on a punching metal member, an expanded metal member, or a metal foil member respectively comprising a nickel material or a nickel-plated metallic material as the collector.

63. The process according to claim 62, wherein said paste is admixed with an electrically conductive auxiliary comprising at least one kind of a powdery material selected from the group consisting of a nickel powder, a copper powder, and a carbon powder, respectively in a spherical form, a flake form, a filament form, a spike form, a needle form, or a form comprising a combination of these forms.

64. The process according to claim 61, wherein methyl cellulose, carboxymethylcellulose, or polyvinyl alcohol is used as the binder.

65. The process according to claim 34, wherein an aqueous solution containing at least potassium hydroxide at a concentration in a range of from 8 to 12 mol/l is used as the alkali electrolyte solution.

66. The process according to claim 65, wherein said aqueous solution contains at least either lithium hydroxide or sodium hydroxide in addition to said potassium hydroxide.

67. The process according to claim 34 which further includes a step wherein after said rechargeable battery is produced, for said rechargeable battery, an operation of performing overcharging of more than 200% with respect to a capacity of the cathode and performing full-discharging is conducted at least one time.

\* \* \* \* \*

UNITED STATES PATENT AND TRADEMARK OFFICE
CERTIFICATE OF CORRECTION

PATENT NO. : 6,649,304 B2
DATED : November 18, 2003
INVENTOR(S) : Tani et al.

It is certified that error appears in the above-identified patent and that said Letters Patent is hereby corrected as shown below:

Column 1,
Line 9, "comprising" should read -- comprises --.
Line 36, "powers" should read -- power --.
Line 54, "conducting" should read -- conducted --.
Line 67, "putted" should read -- put --.

Column 2,
Lines 4 and 15, "has" should read -- has been --.
Line 31, "an uniform" should read -- a uniform --.
Line 33, "form an" should read -- form a --.
Line 49, "have" should read -- has been --.

Column 4,
Line 32, "attempted" should read -- an attempt --.
Line 57, "$\beta$-type" should read -- $\alpha$-type --.
Line 58, "approximate" should read -- approimately --.

Column 5,
Line 24, "ref erred" should read -- referred --.

Column 6,
Line 50, "comprises" should read -- comprise --.

Column 8,
Lines 45 and 50, "comprises" should read -- comprise --.

Column 9,
Line 35, "pre-" should read -- per- --.

Column 11,
Line 15, "a electrically" should read -- an electrically --.

Column 13,
Line 28, "corresponds a plane" should read -- corresponds to a plane --.
Line 29, "face corresponds" should read -- face corresponds to --.
Line 31, "corresponding" should read -- corresponding to --.

Column 16,
Line 66, "(b" should read -- (b) --.

UNITED STATES PATENT AND TRADEMARK OFFICE
CERTIFICATE OF CORRECTION

PATENT NO. : 6,649,304 B2
DATED : November 18, 2003
INVENTOR(S) : Tani et al.

It is certified that error appears in the above-identified patent and that said Letters Patent is hereby corrected as shown below:

Column 17,
Line 49, "efficient," should read -- efficiency, --.

Column 19,
Line 6, "comprises" should read -- comprise --.

Column 20,
Line 55, "generate." should read -- generated. --.

Column 22,
Line 6, "obtain" should read -- obtained --.

Column 23,
Line 21, "flown" should read -- flowed --.

Column 24,
Line 49, "a X-ray" should read -- an X-ray --.

Column 41,
Line 39, "containing" should read -- contains --.

Signed and Sealed this

Twenty-eighth Day of June, 2005

JON W. DUDAS
*Director of the United States Patent and Trademark Office*